(12) United States Patent
Fujimaki et al.

(10) Patent No.: US 11,054,650 B2
(45) Date of Patent: Jul. 6, 2021

(54) HEAD-MOUNTED DISPLAY DEVICE, CONTROL METHOD OF HEAD-MOUNTED DISPLAY DEVICE, AND DISPLAY SYSTEM

(71) Applicant: Seiko Epson Corporation, Tokyo (JP)

(72) Inventors: Yutaka Fujimaki, Matsumoto (JP); Hideho Kaneko, Shiojiri (JP); Masahide Takano, Matsumoto (JP); Naoto Aruga, Okaya (JP); Kaori Sendai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/293,975

(22) Filed: Mar. 6, 2019

(65) Prior Publication Data

US 2019/0271846 A1 Sep. 5, 2019

Related U.S. Application Data

(62) Division of application No. 14/773,689, filed as application No. PCT/JP2014/001464 on Mar. 14, 2014, now abandoned.

(30) Foreign Application Priority Data

Mar. 26, 2013 (JP) ................. 2013-063731
Jul. 26, 2013 (JP) ................. 2013-156022
Oct. 25, 2013 (JP) ................. 2013-222143

(51) Int. Cl.
*G02B 27/01* (2006.01)
*G06T 19/00* (2011.01)
(Continued)

(52) U.S. Cl.
CPC ..... *G02B 27/0172* (2013.01); *G02B 27/0101* (2013.01); *G02B 27/017* (2013.01);
(Continued)

(58) Field of Classification Search
CPC .. G02B 27/01; G02B 27/0101; G02B 27/017; G02B 27/0172; G02B 27/0179;
(Continued)

(56) References Cited

U.S. PATENT DOCUMENTS 5,742,264 A 4/1998 Inagaki
6,088,006 A 7/2000 Tabata
(Continued)

FOREIGN PATENT DOCUMENTS

EP 2421276 A2 2/2012
GB 2376397 A 12/2002
(Continued)

OTHER PUBLICATIONS

Daniel G. Aliaga, Virtual Objects in the Real World, Communications of the ACM, vol. 40, No, 3, pp. 49-54, Mar. 1, 1997.
(Continued)

*Primary Examiner* — Jason M Mandeville
(74) *Attorney, Agent, or Firm* — JCIPRNET

(57) ABSTRACT

A head-mounted display device that enables a user to visually recognize a virtual image and an external scene includes an image display unit that causes the user to visually recognize the virtual image and an augmented reality processing unit that forms on the image display unit the virtual image indicating a virtual object which is an object for providing augmented reality to the user and of which the user's visual discomfort is reduced.

7 Claims, 23 Drawing Sheets

(51) Int. Cl.
*H04N 13/344* (2018.01)
*G06F 3/01* (2006.01)

(52) U.S. Cl.
CPC ............ *G06F 3/011* (2013.01); *G06T 19/006* (2013.01); *H04N 13/344* (2018.05); *G02B 2027/014* (2013.01); *G02B 2027/0129* (2013.01); *G02B 2027/0138* (2013.01); *G02B 2027/0178* (2013.01); *G02B 2027/0187* (2013.01)

(58) Field of Classification Search
CPC .... G02B 2027/0129; G02B 2027/0134; G02B 2027/0136; G02B 2027/0138; G02B 2027/014; G02B 2027/0141; G02B 2027/0143; G02B 2027/0178; G02B 2027/0187; H04N 13/344; G06F 3/011; G06T 19/006
USPC ......................................... 345/7–9, 632–633
See application file for complete search history.

(56) References Cited

U.S. PATENT DOCUMENTS

| | | | |
|---|---|---|---|
| 6,111,597 A | 8/2000 | Tabata | |
| 6,179,619 B1 | 1/2001 | Tanaka | |
| 6,369,952 B1 | 4/2002 | Rallison | |
| 6,449,309 B1 * | 9/2002 | Tabata | H04N 13/344 375/240.01 |
| 6,570,566 B1 | 5/2003 | Yoshigahara | |
| 8,760,502 B2 | 6/2014 | Yoon | |
| 9,213,163 B2 | 12/2015 | Lewis | |
| 9,311,751 B2 | 4/2016 | Lamb | |
| 10,140,768 B2 * | 11/2018 | Takahashi | G06T 19/006 |
| 2002/0188760 A1 | 12/2002 | Kuwahara | |
| 2003/0185461 A1 | 10/2003 | Ohshima | |
| 2006/0028543 A1 | 2/2006 | Sohn et al. | |
| 2006/0044327 A1 | 3/2006 | Okuno et al. | |
| 2009/0102845 A1 | 4/2009 | Takemoto et al. | |
| 2009/0149265 A1 | 6/2009 | Holzberg et al. | |
| 2010/0026787 A1 | 2/2010 | Yasuda et al. | |
| 2010/0134495 A1 | 6/2010 | Matsui | |
| 2011/0193945 A1 | 8/2011 | Tsuchida | |
| 2011/0234584 A1 | 9/2011 | Endo | |
| 2011/0234631 A1 | 9/2011 | Kim et al. | |
| 2011/0248904 A1 | 10/2011 | Miyawaki et al. | |
| 2012/0056992 A1 | 3/2012 | Kuroda | |
| 2012/0200592 A1 | 8/2012 | Kimura | |
| 2012/0206452 A1 * | 8/2012 | Geisner | H04S 7/304 345/419 |
| 2012/0249416 A1 | 10/2012 | Maciocci et al. | |
| 2012/0306940 A1 * | 12/2012 | Machida | G02B 6/005 345/690 |
| 2012/0309478 A1 | 12/2012 | Kotsugai | |
| 2013/0147859 A1 | 6/2013 | Kobayashi | |
| 2013/0170031 A1 * | 7/2013 | Bohn | G02B 30/36 359/480 |
| 2013/0286004 A1 | 10/2013 | McCulloch | |
| 2013/0293469 A1 | 11/2013 | Hakoda et al. | |
| 2014/0347252 A1 | 11/2014 | Miyawaki et al. | |
| 2015/0193985 A1 | 7/2015 | Takemoto et al. | |
| 2015/0269784 A1 | 9/2015 | Miyawaki et al. | |
| 2017/0115492 A1 | 4/2017 | Miyawaki et al. | |

FOREIGN PATENT DOCUMENTS

| | | |
|---|---|---|
| JP | 05-328408 A | 12/1993 |
| JP | 09-233499 A | 9/1997 |
| JP | H10-188034 A | 7/1998 |
| JP | 10-309381 A | 11/1998 |
| JP | 11-202256 A | 7/1999 |
| JP | 2000-214408 A | 8/2000 |
| JP | 2000-354257 A | 12/2000 |
| JP | 2003-030370 A | 1/2003 |
| JP | 2003-296759 A | 10/2003 |
| JP | 2004-234549 A | 8/2004 |
| JP | 2005-165531 A | 6/2005 |
| JP | 2005-165776 A | 6/2005 |
| JP | 3717653 B | 11/2005 |
| JP | 2005-346468 A | 12/2005 |
| JP | 2006-12042 A | 1/2006 |
| JP | 2008-183231 A | 8/2008 |
| JP | 2008-227865 A | 9/2008 |
| JP | 2009-104249 A | 5/2009 |
| JP | 2011-510688 A | 4/2011 |
| JP | 2011-166285 A | 8/2011 |
| JP | 2011-205358 A | 10/2011 |
| JP | 2011-221235 A | 11/2011 |
| JP | 2012-058968 A | 3/2012 |
| JP | 2012-163637 A | 8/2012 |
| JP | 2012-244466 A | 12/2012 |
| JP | 2013-517579 A | 5/2013 |
| JP | 2013-122519 A | 6/2013 |
| WO | WO-2013054462 A | 3/2015 |

OTHER PUBLICATIONS

Search Report received in International Application No. PCT/JP2014/00464, dated Sep. 10, 2014.
Non-Final Office Action received in U.S. Appl. No. 14/773,689, dated Jun. 26, 2017.
Final Office Action received in U.S. Appl. No. 14/773,680, dated Dec. 1, 2017.
Development of AR-based information presentation device considering interaction with real objects and virtual objects, ITE Technical Report vol. 35, No. 9, Feb. 21, 2011.
Fast Shading and Shadowing of Virtual Objects Using Shadowing Planes in Mixed Reality, Kakuta et al., J. Inst. Image Inform. TV. Engnr vol. 62, No. 5, pp. 78, 2008.
2 ARToolKit-Based Application Development in C/C++, Software Design, Sunao Hashimoto, Japan, Gijutsu-Hyohron Co., Ltd., Jan. 18, 2009, vol. 219, p. 155-162.
Non-Final Office Action received in U.S. Appl. No. 14/773,689, dated Apr. 18, 2018.
Uchiyama et al., Strategy Based Pool Supporting System, Graduate School of Science and Technology, IPSJ SIG Technical Report, Mar. 2, 2007.
Final Office Action received in U.S. Appl. No. 14/773,689, dated Nov. 7, 2018.

* cited by examiner

[Fig. 1]
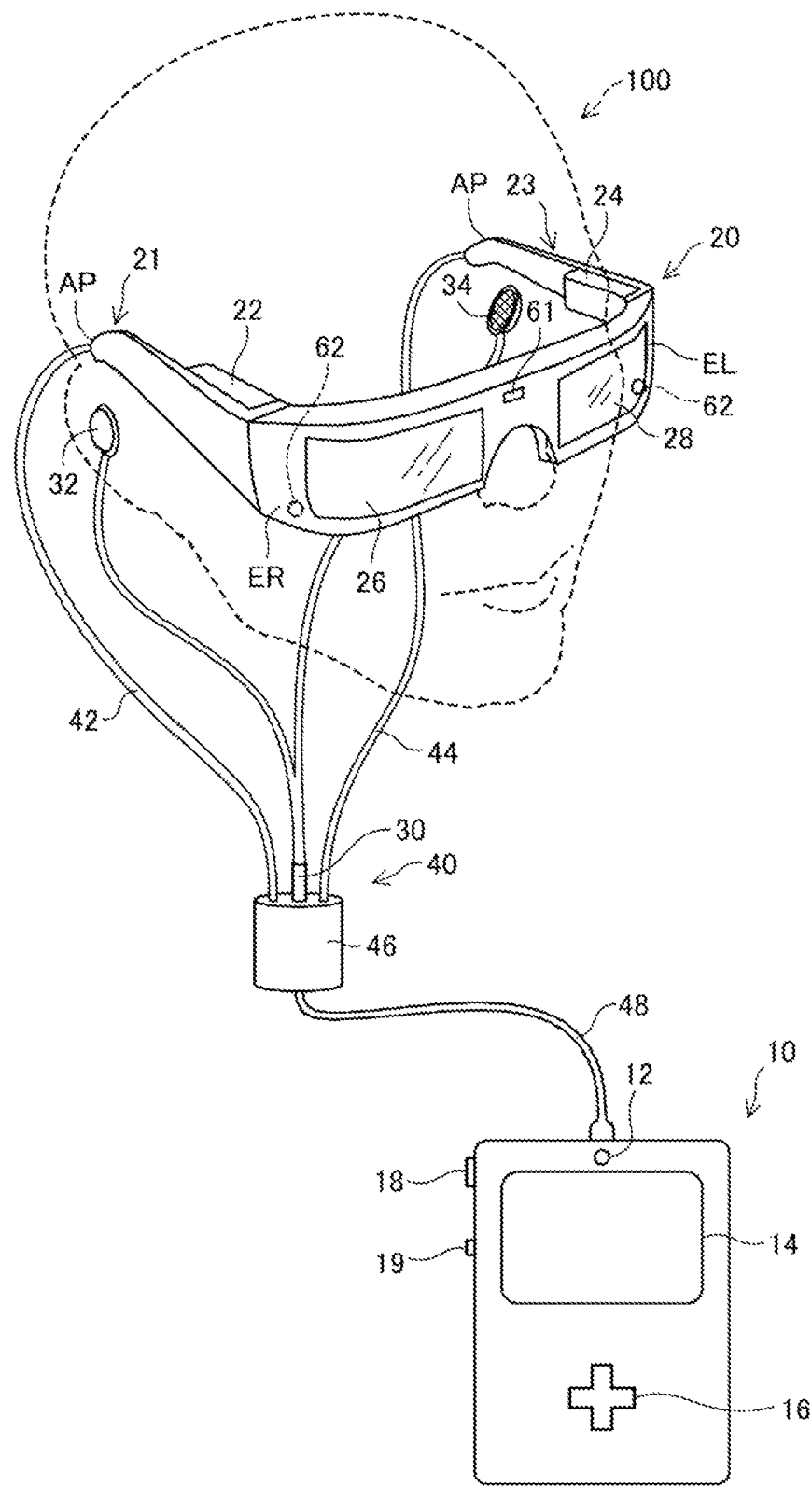

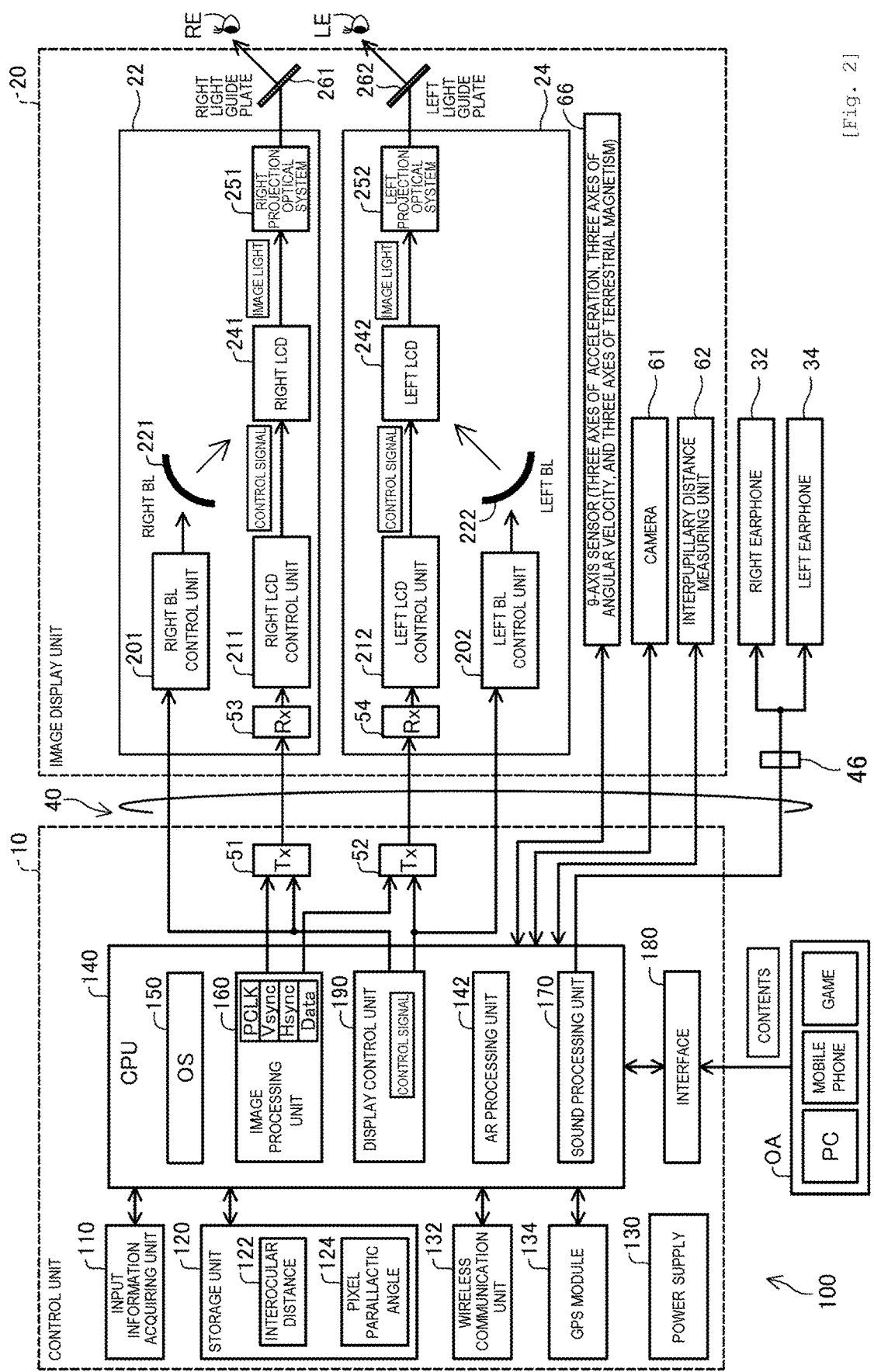
[Fig. 2]

[Fig. 3A]
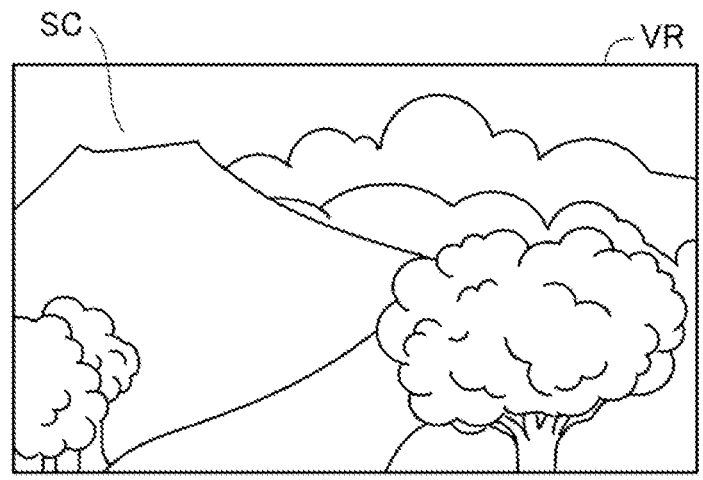
[Fig. 3B]
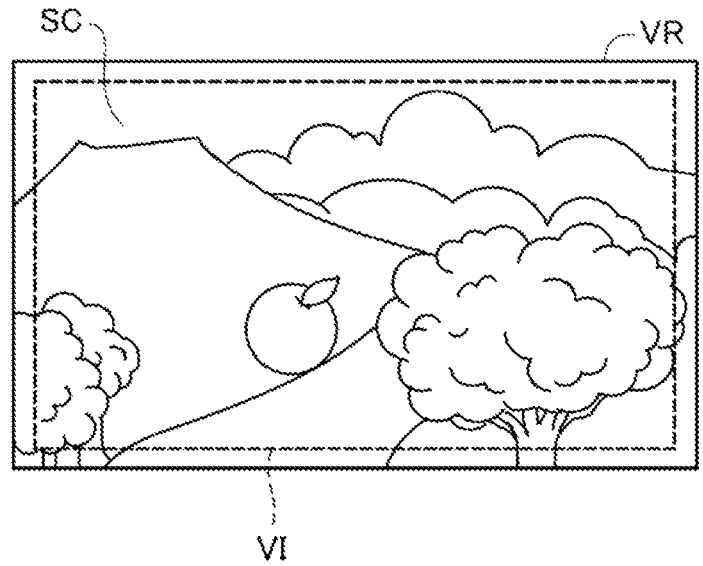

[Fig. 4]
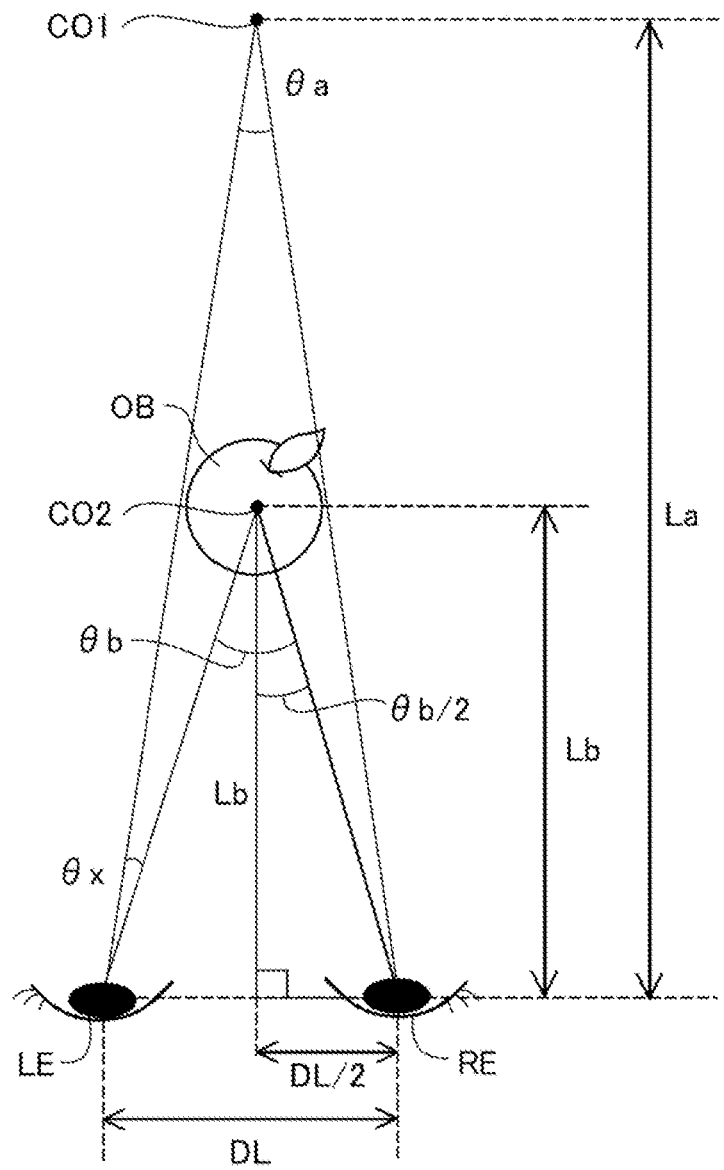
$\tan(\theta b / 2) = (DL/2)/Lb$
$\tan(\theta b / 2) = DL/(2 \times Lb)$
$\theta b / 2 = \arctan[DL/(2 \times Lb)]$
$\theta b = 2 \times \arctan[DL/(2 \times Lb)]$ ⋯(1)
$\theta x = (\theta b - \theta a)/2$ ⋯(2)

[Fig. 5]
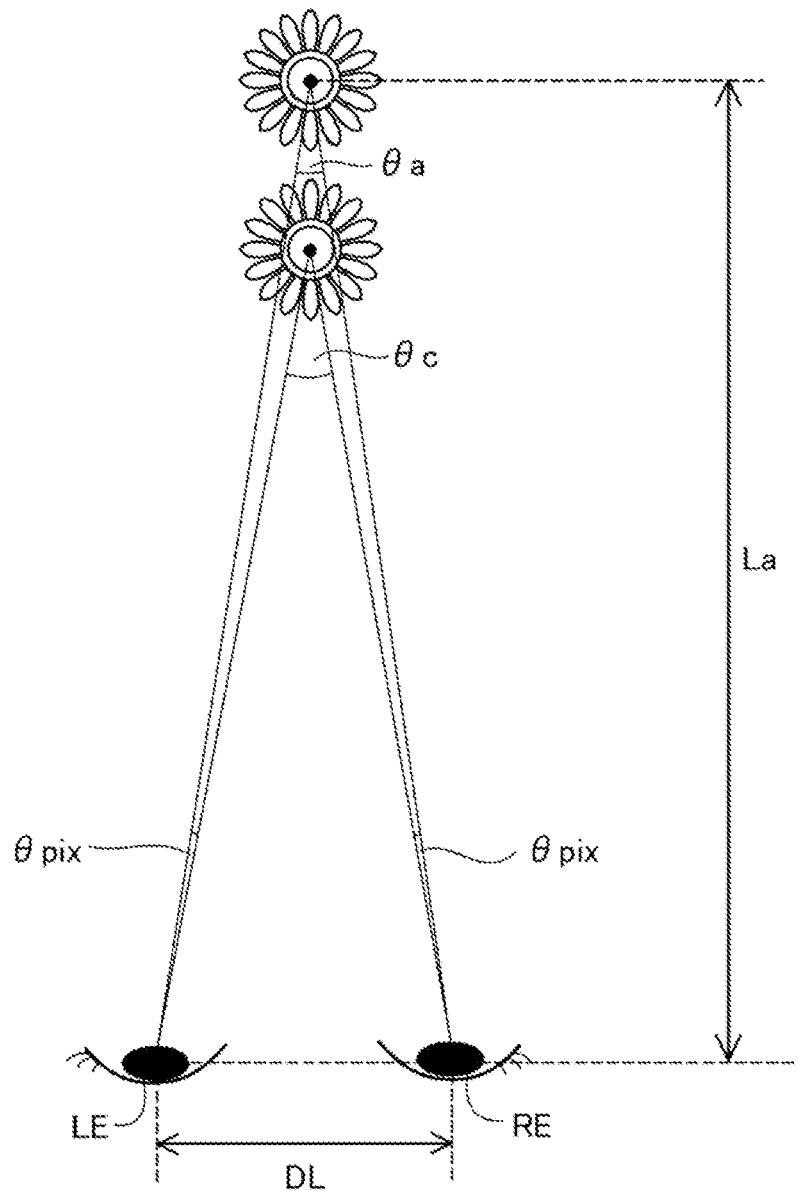
$\theta\,pix = (\theta\,c - \theta\,a)/2$

[Fig. 6A]
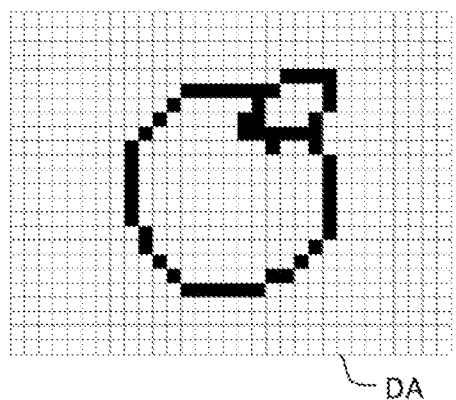
DA
[Fig. 6B]
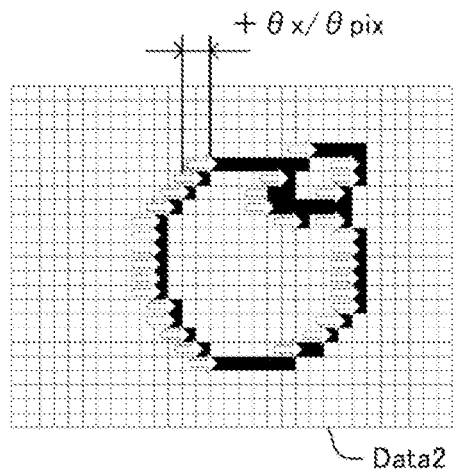
+θx/θpix
Data2
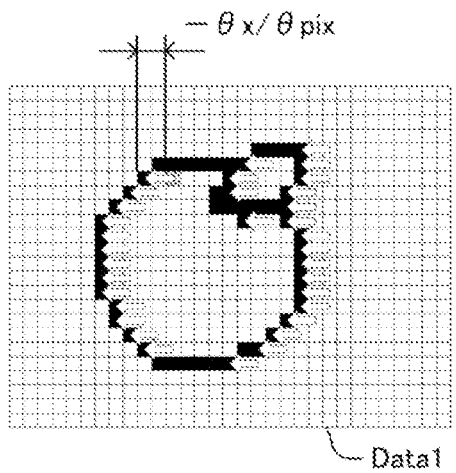
−θx/θpix
Data1

[Fig. 7]
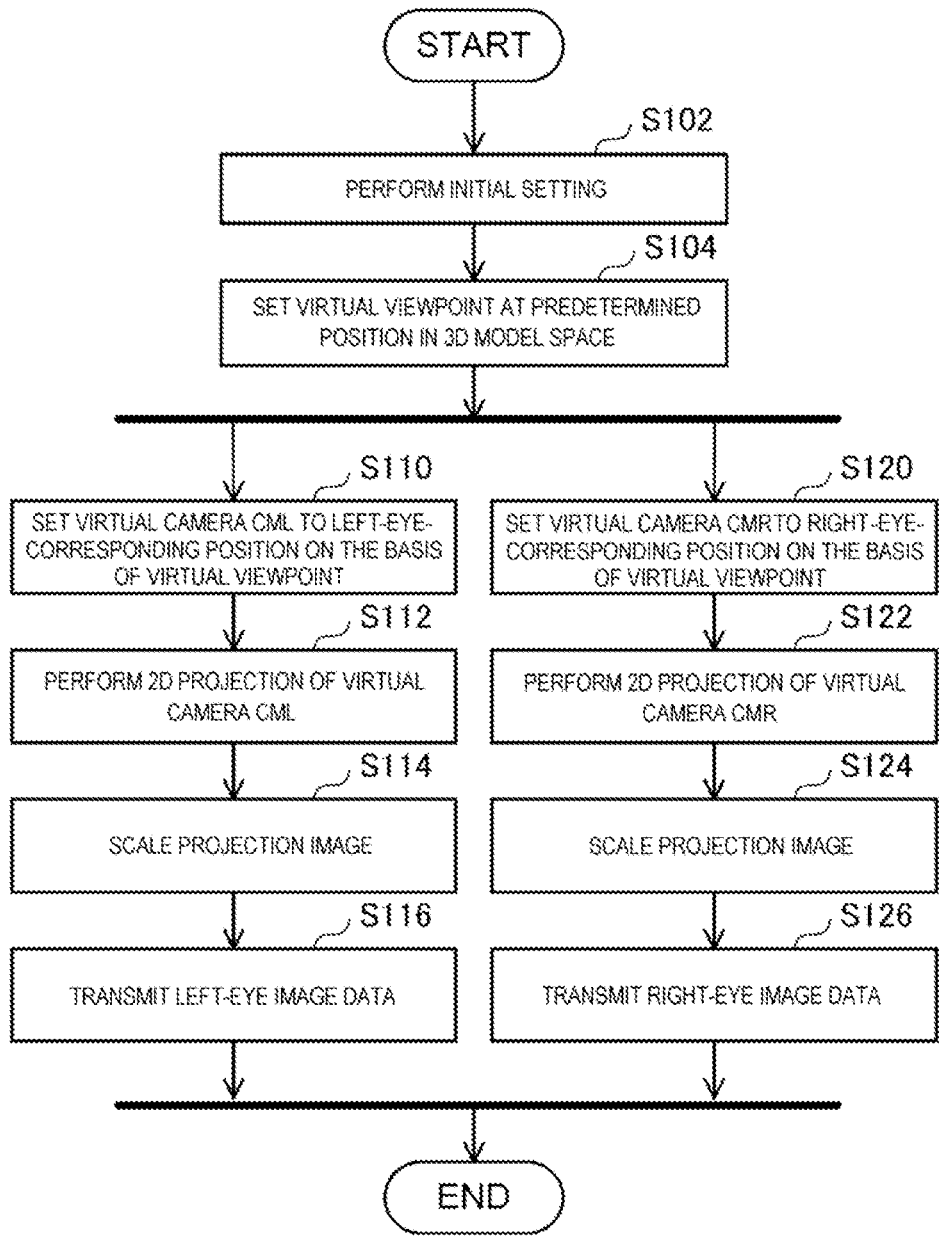

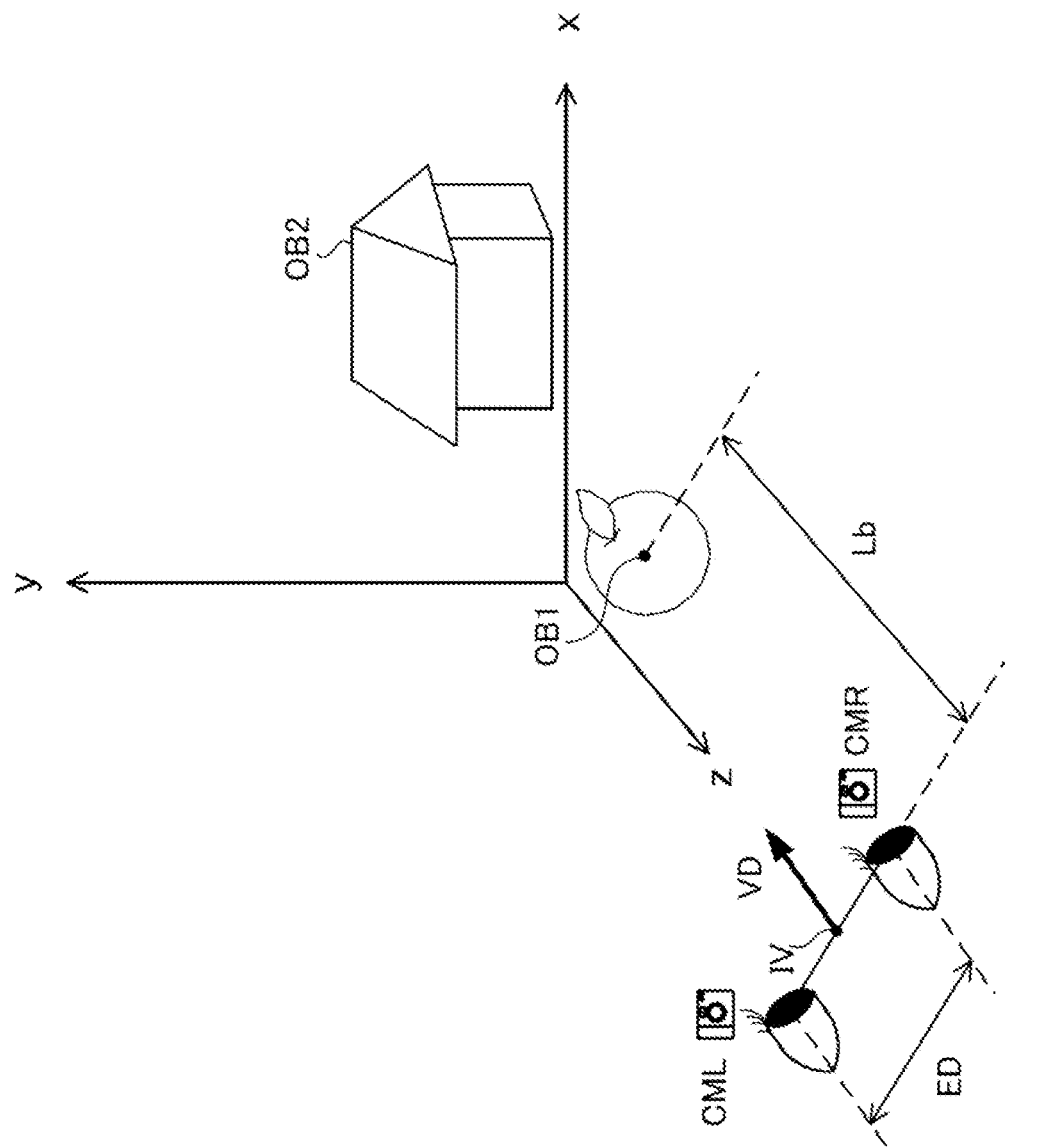
[Fig. 8]

[Fig. 9]
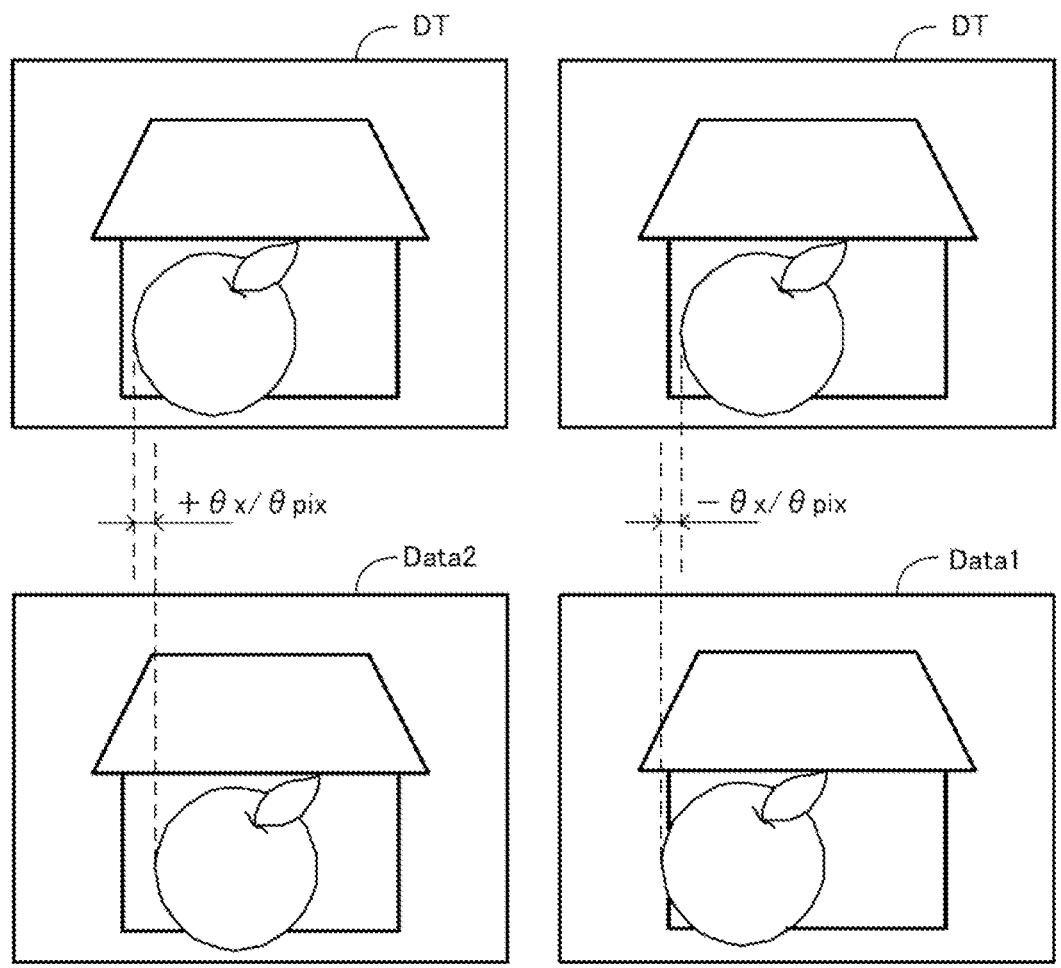

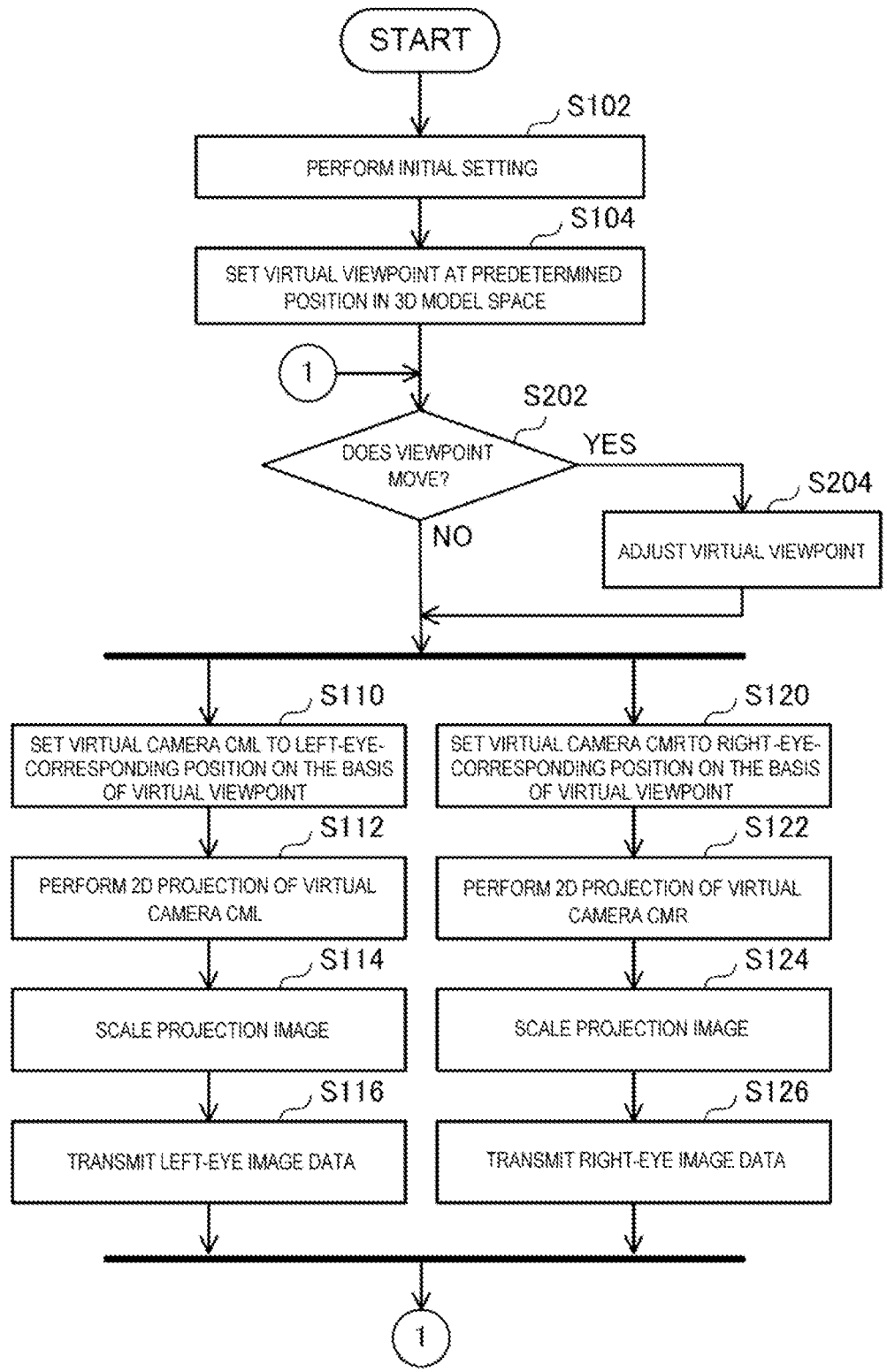
[Fig. 10]

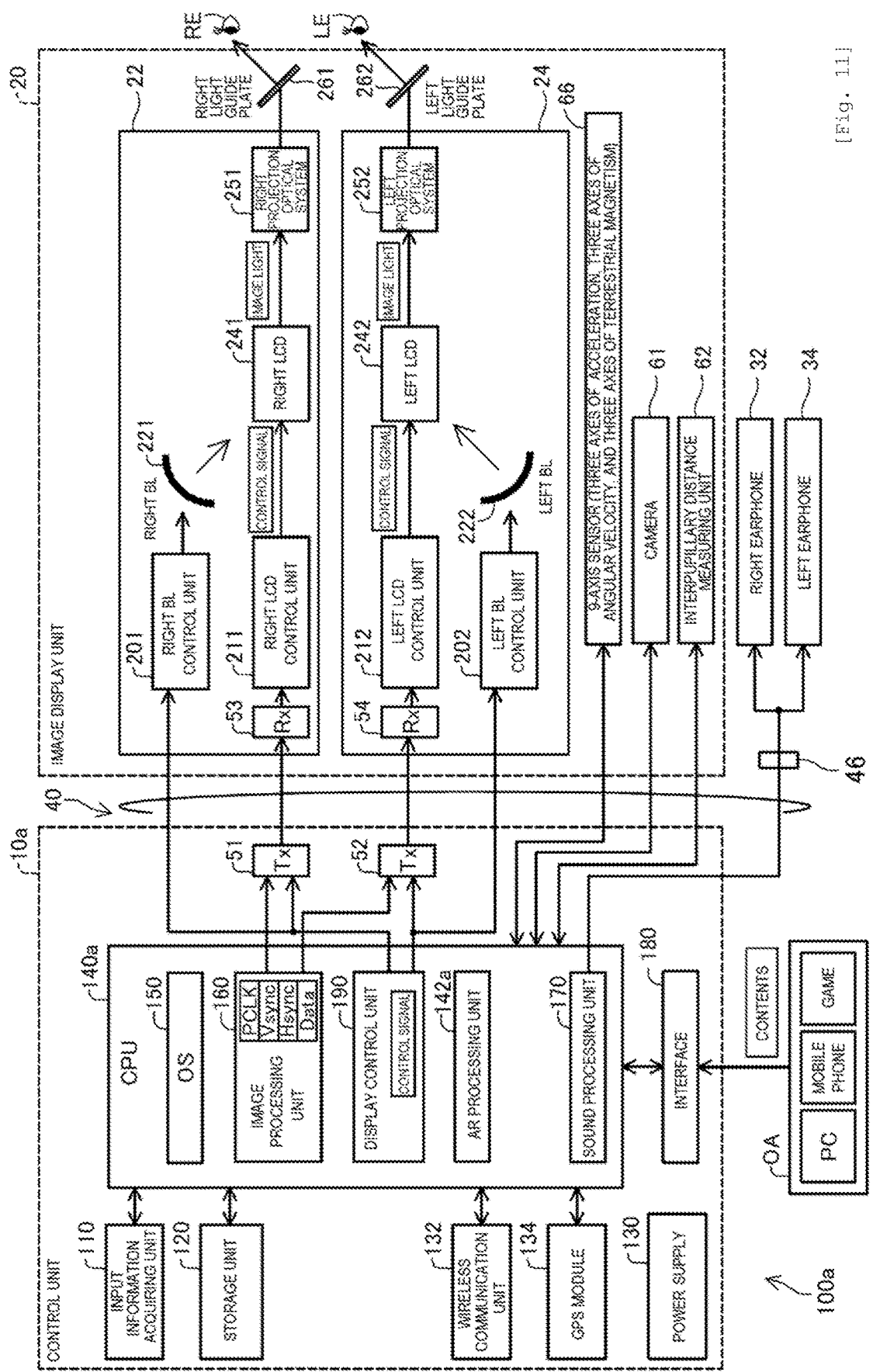
[Fig. 11]

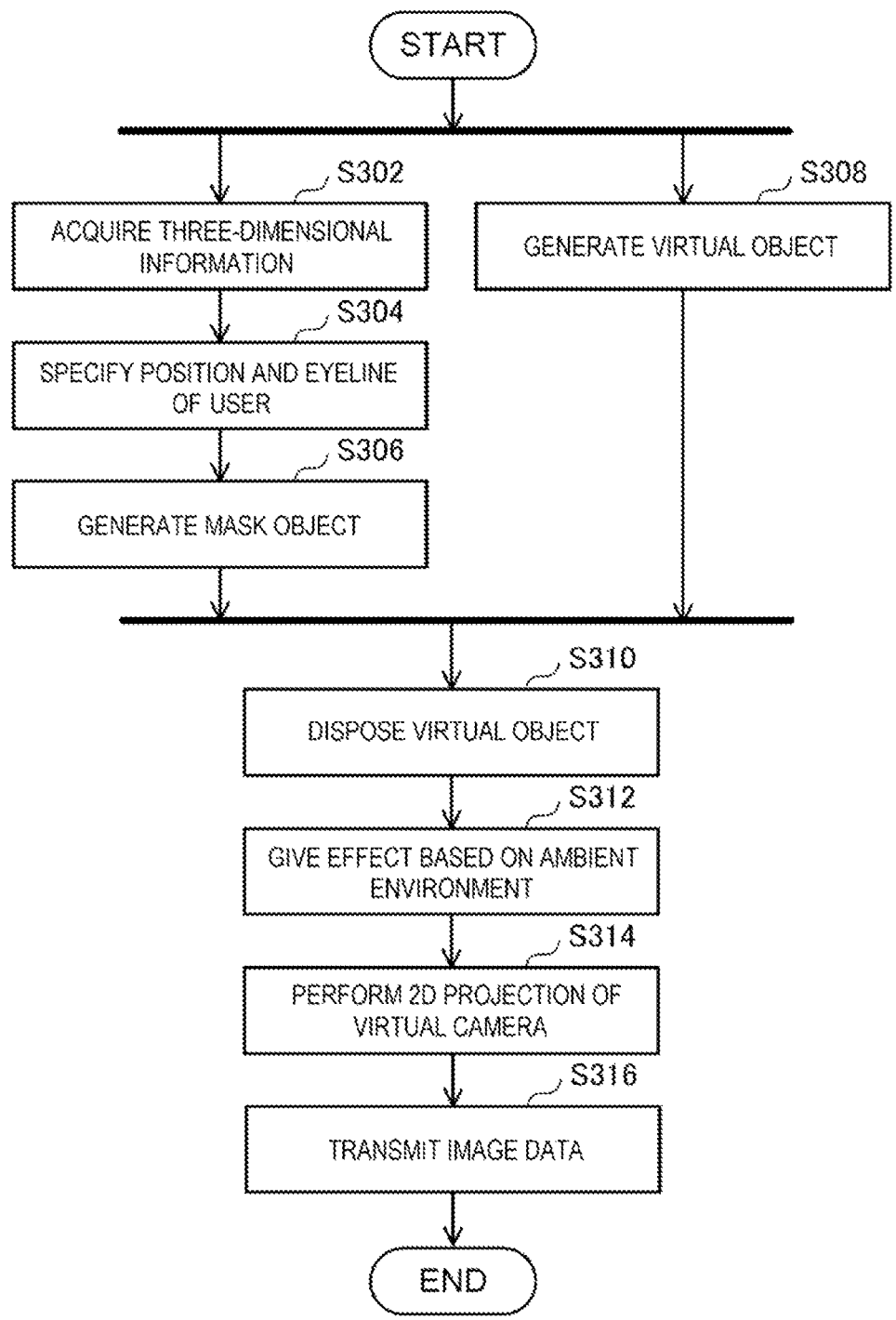
[Fig. 12]

[Fig. 13A]
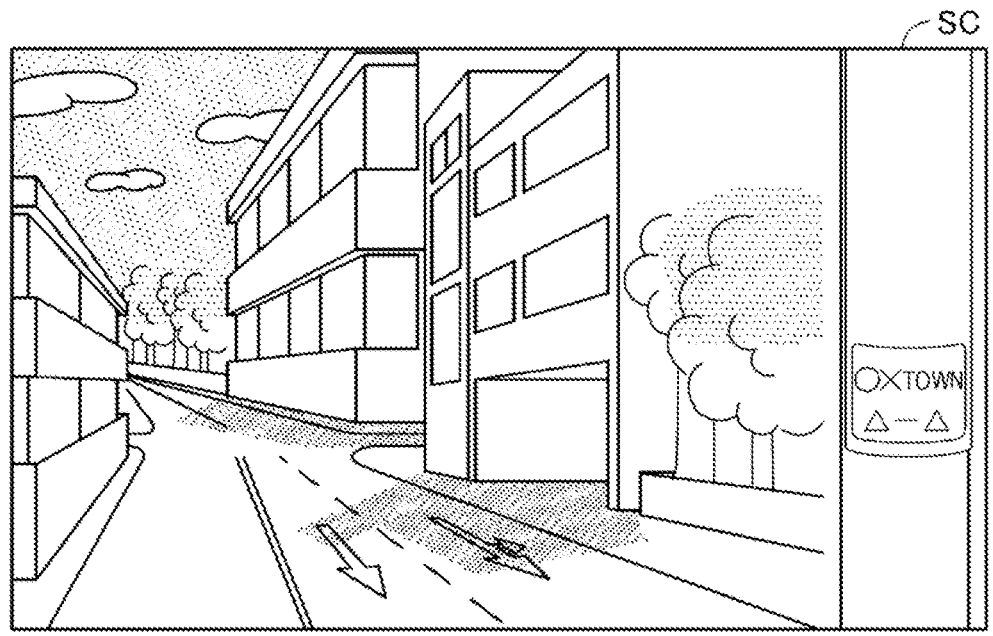
[Fig. 13B]
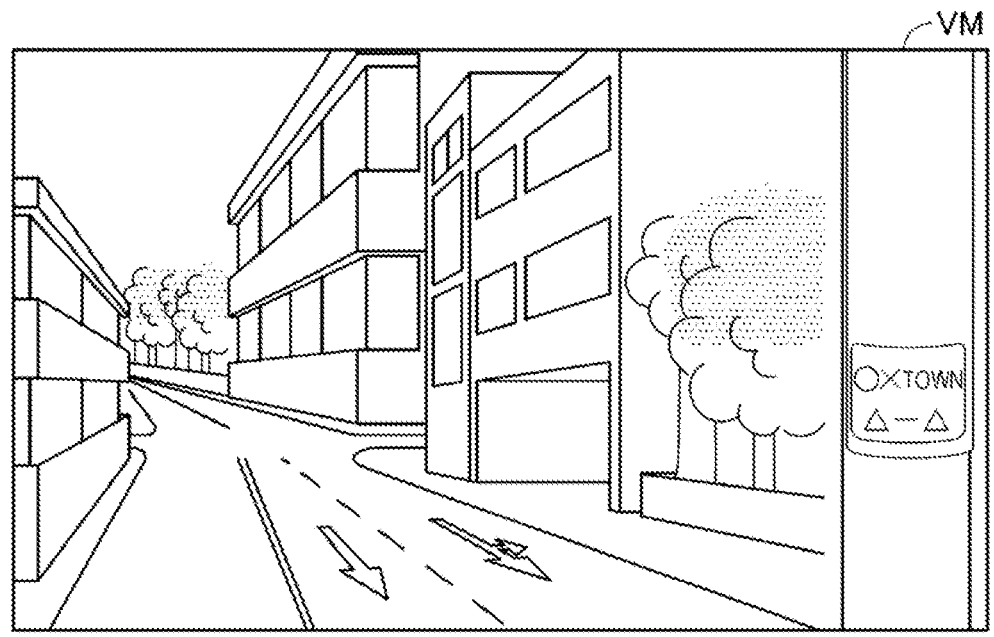

[Fig. 14]
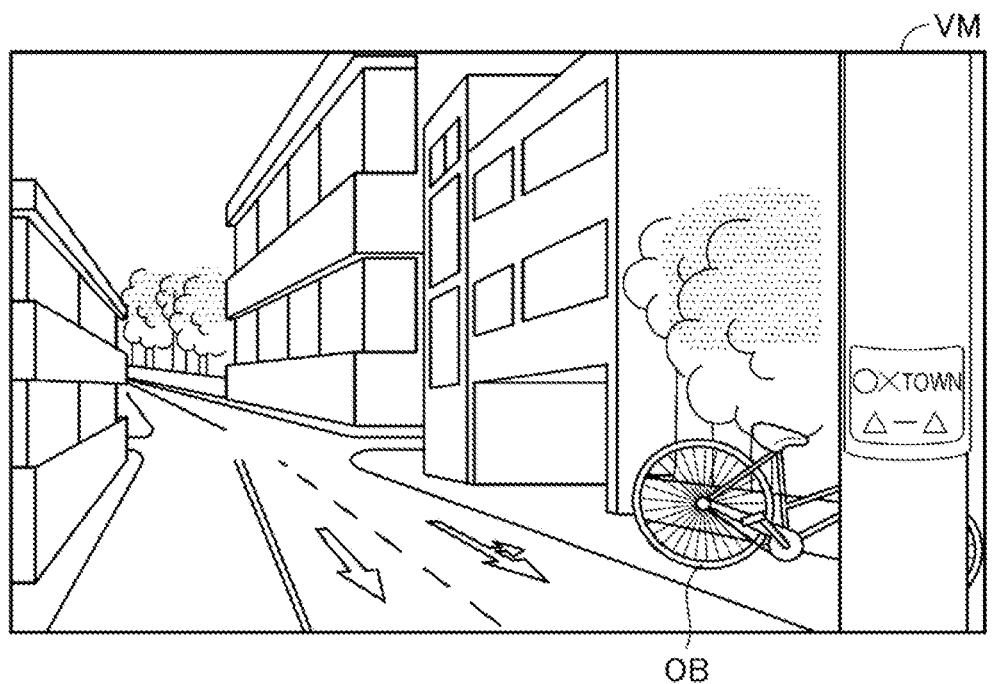
[Fig. 15]
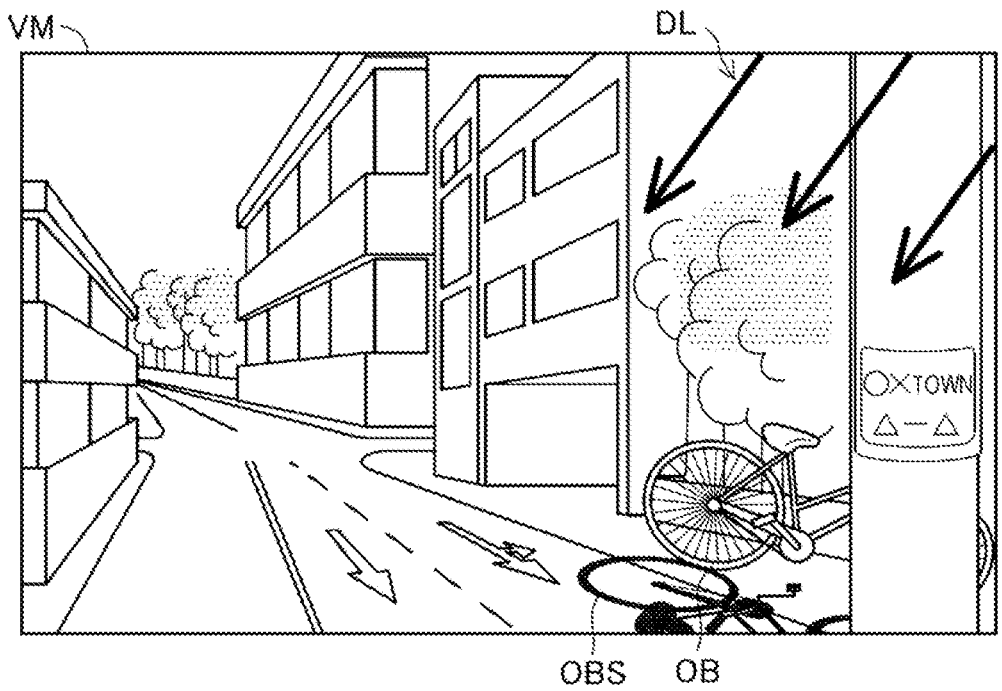

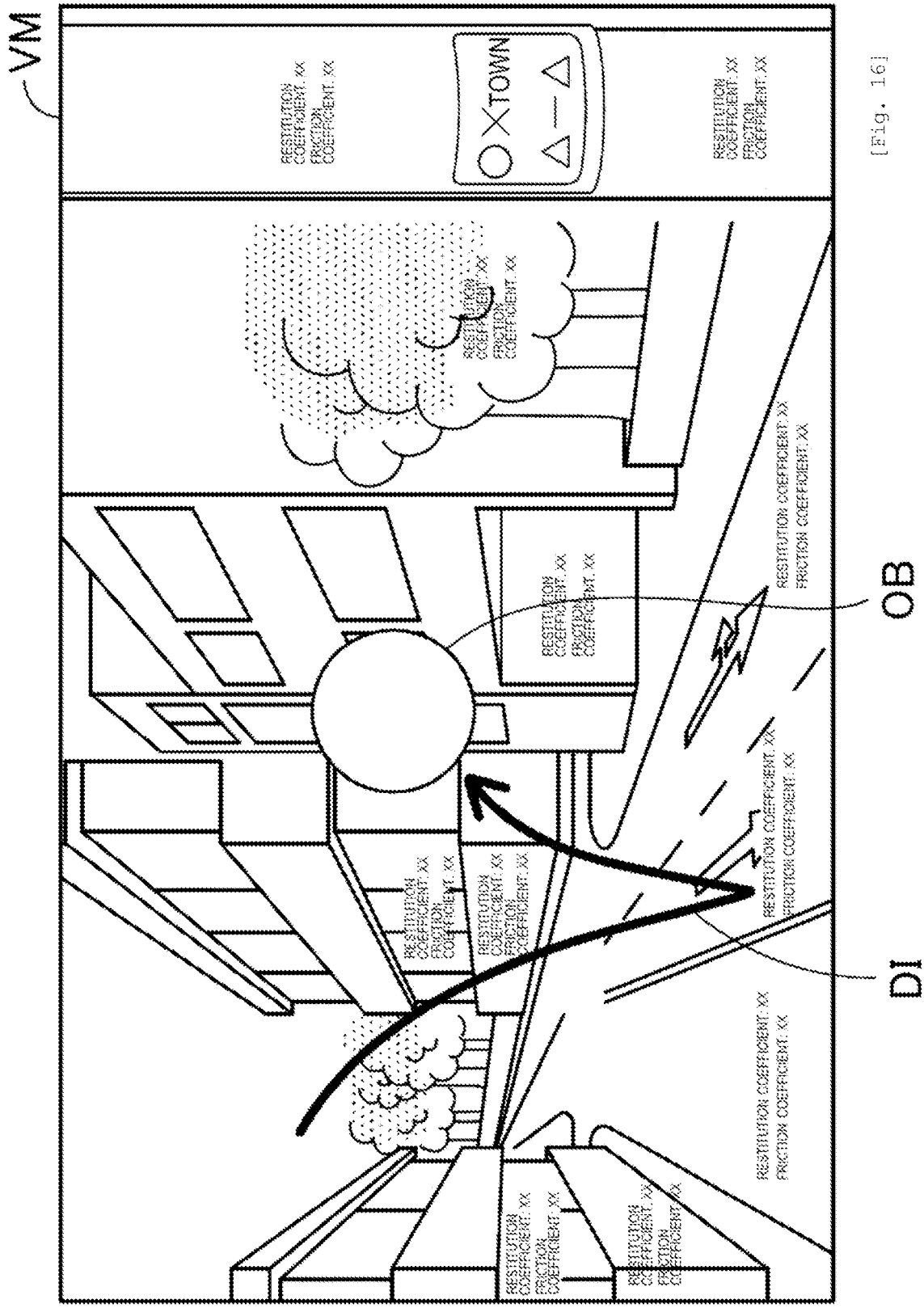
[Fig. 16]

[Fig. 17]
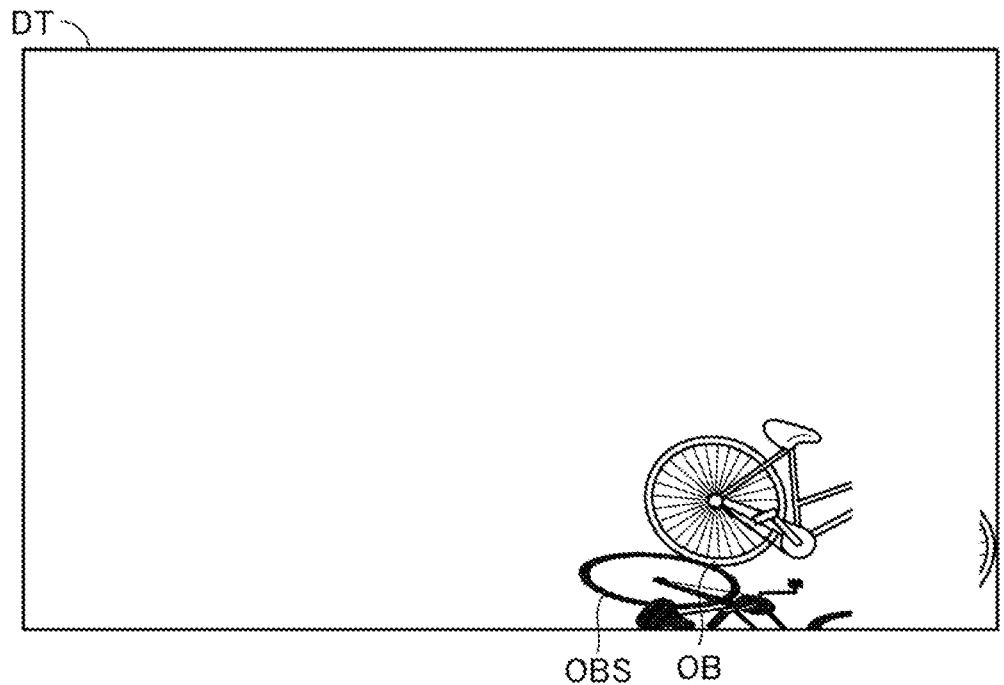
[Fig. 18]
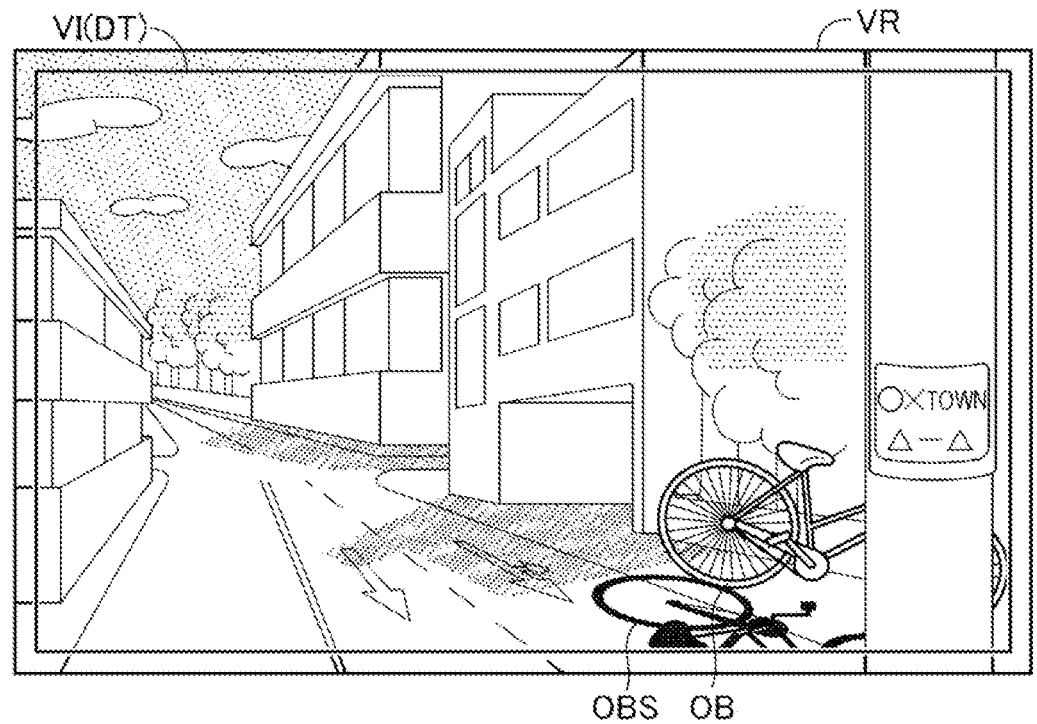

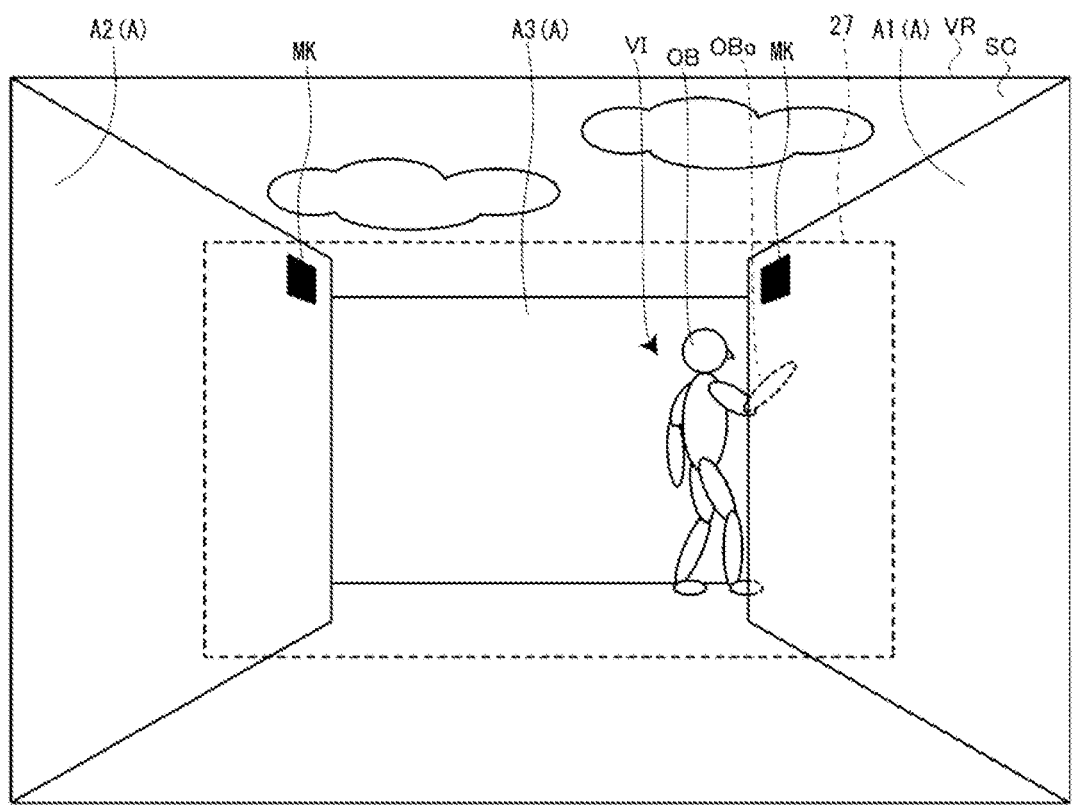
[Fig. 19]

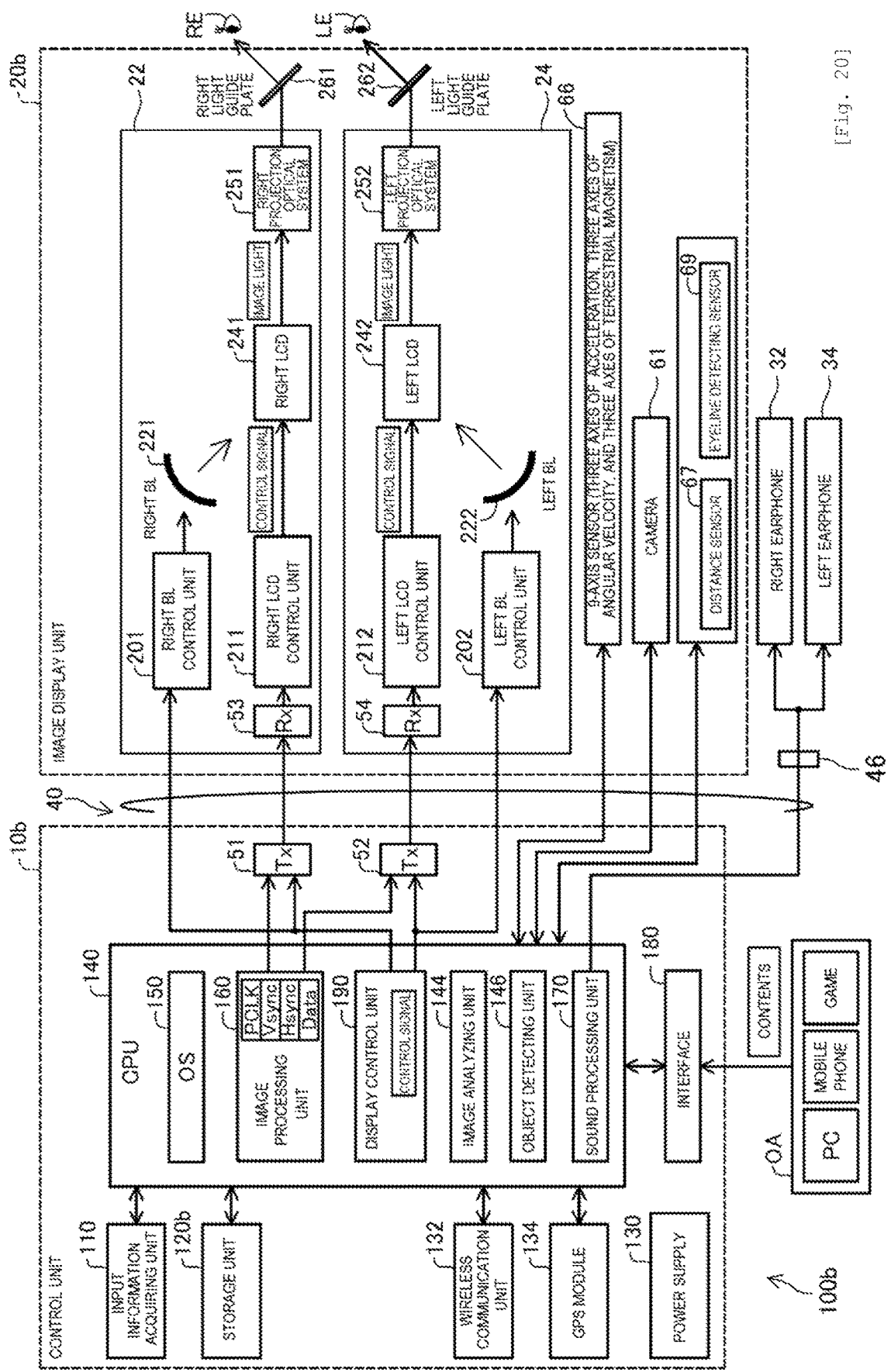
[Fig. 20]

[Fig. 21]
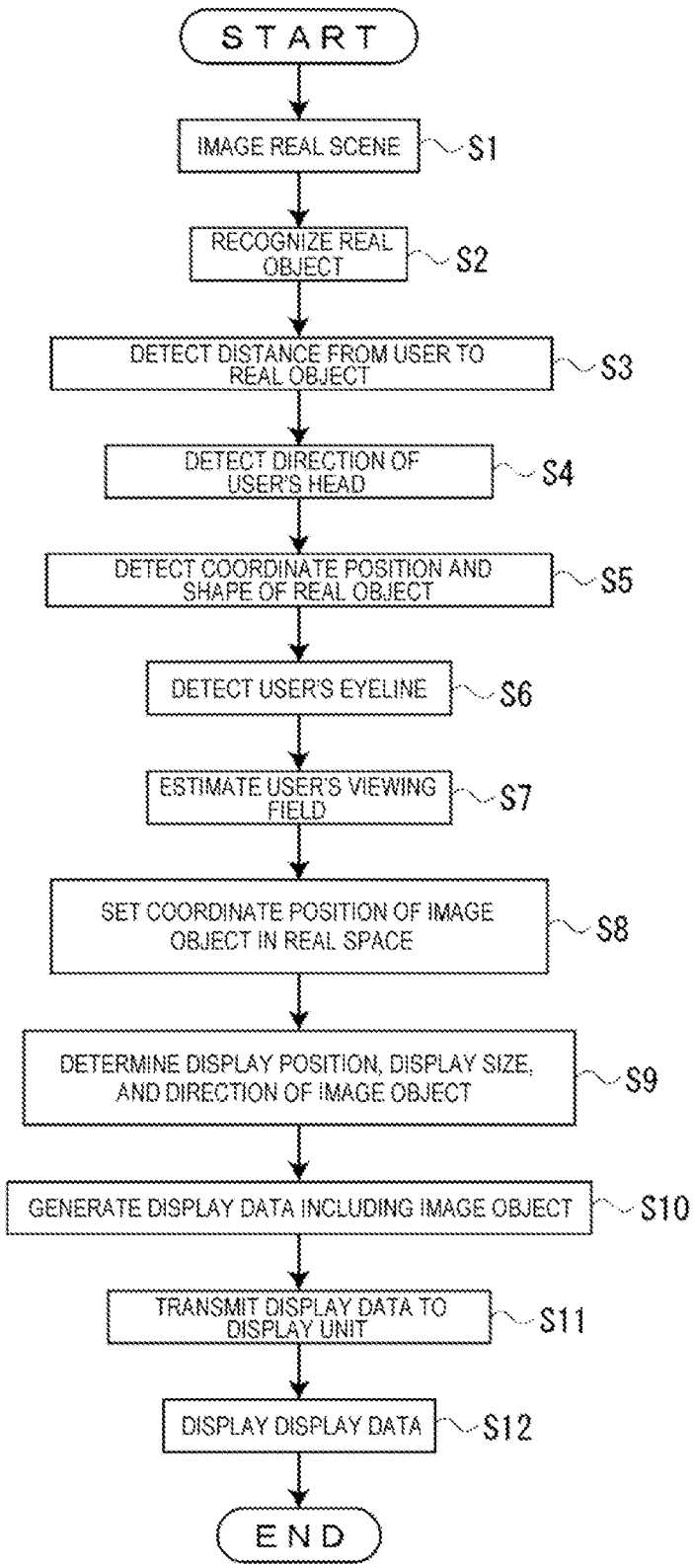

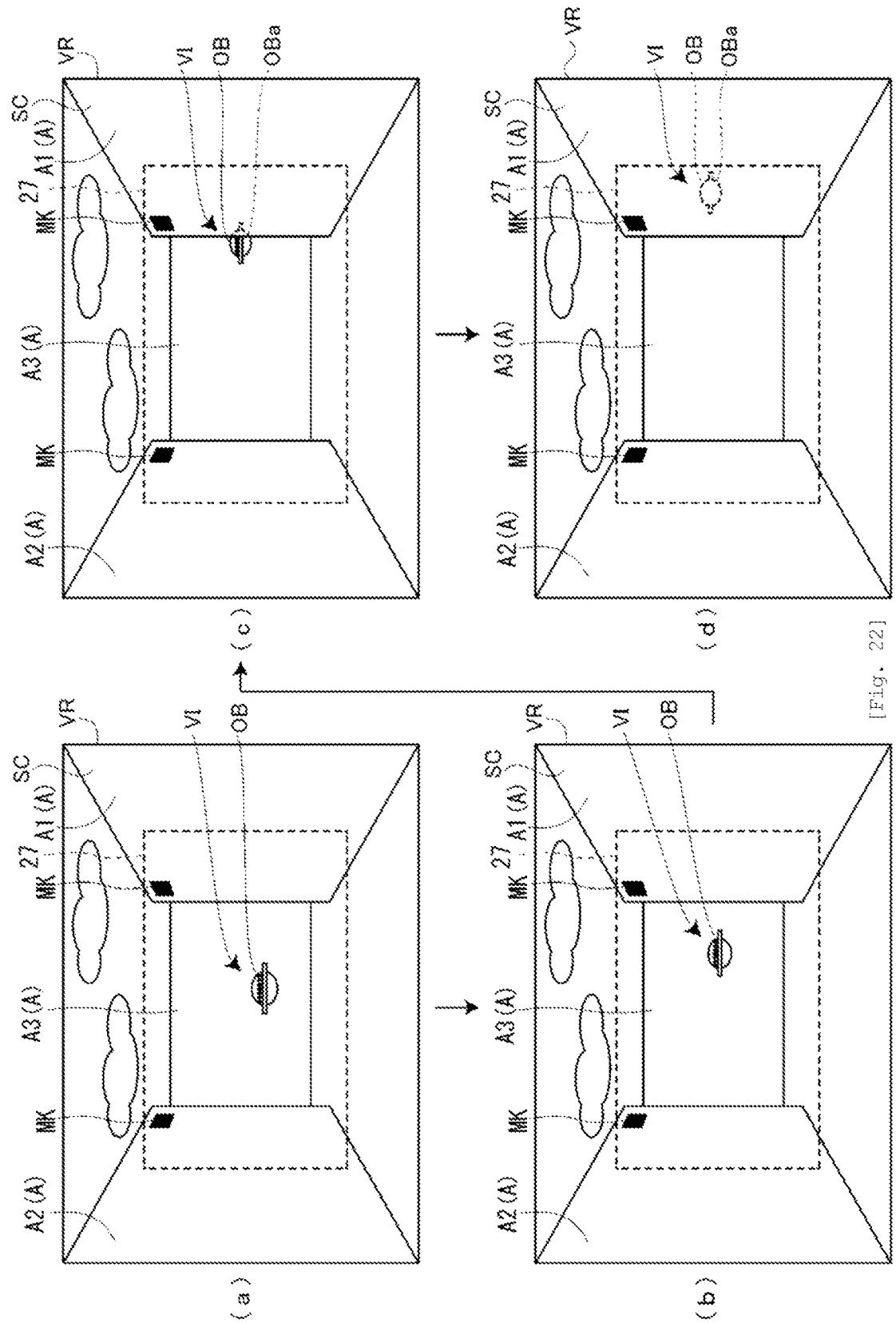
[Fig. 22]

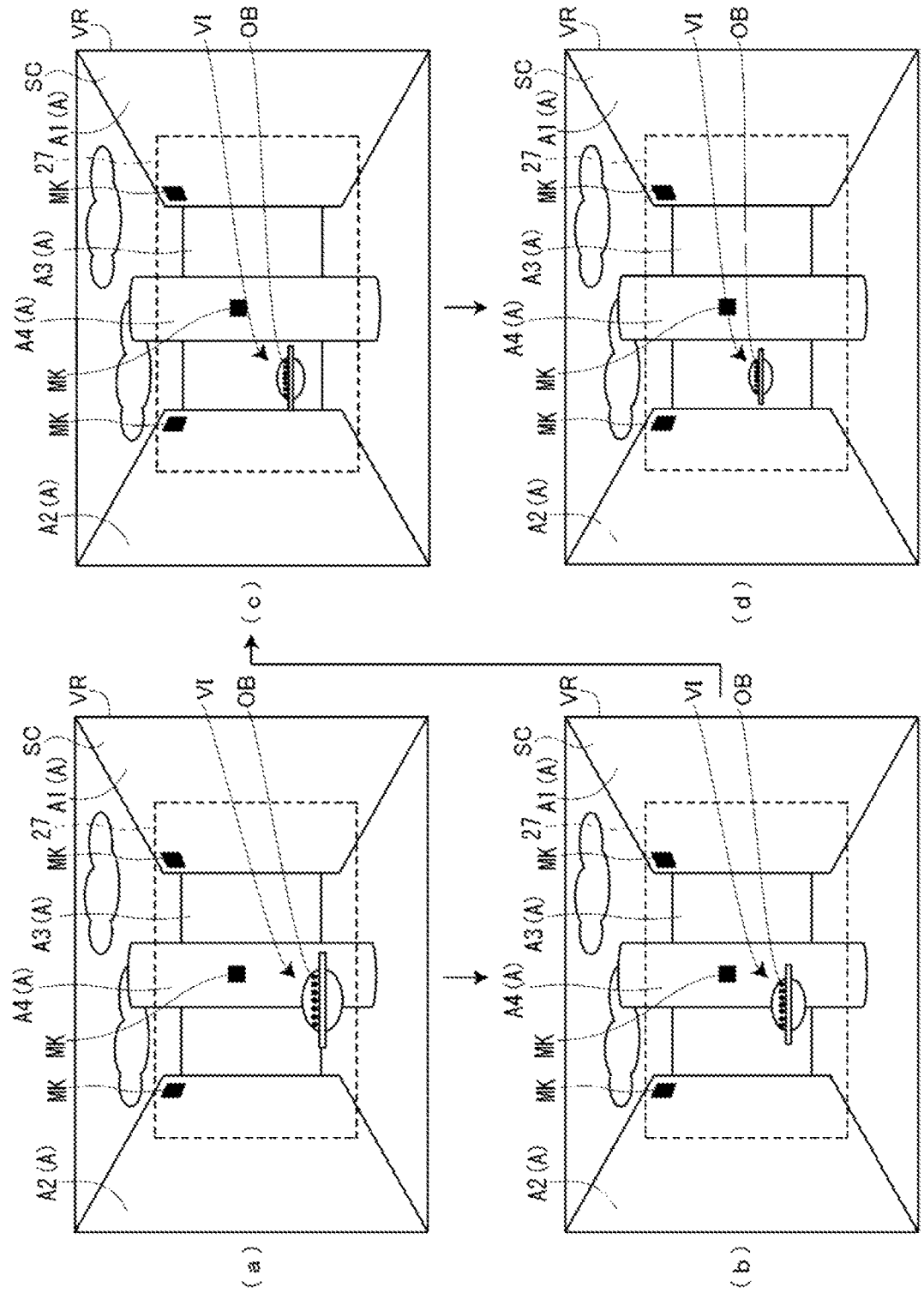

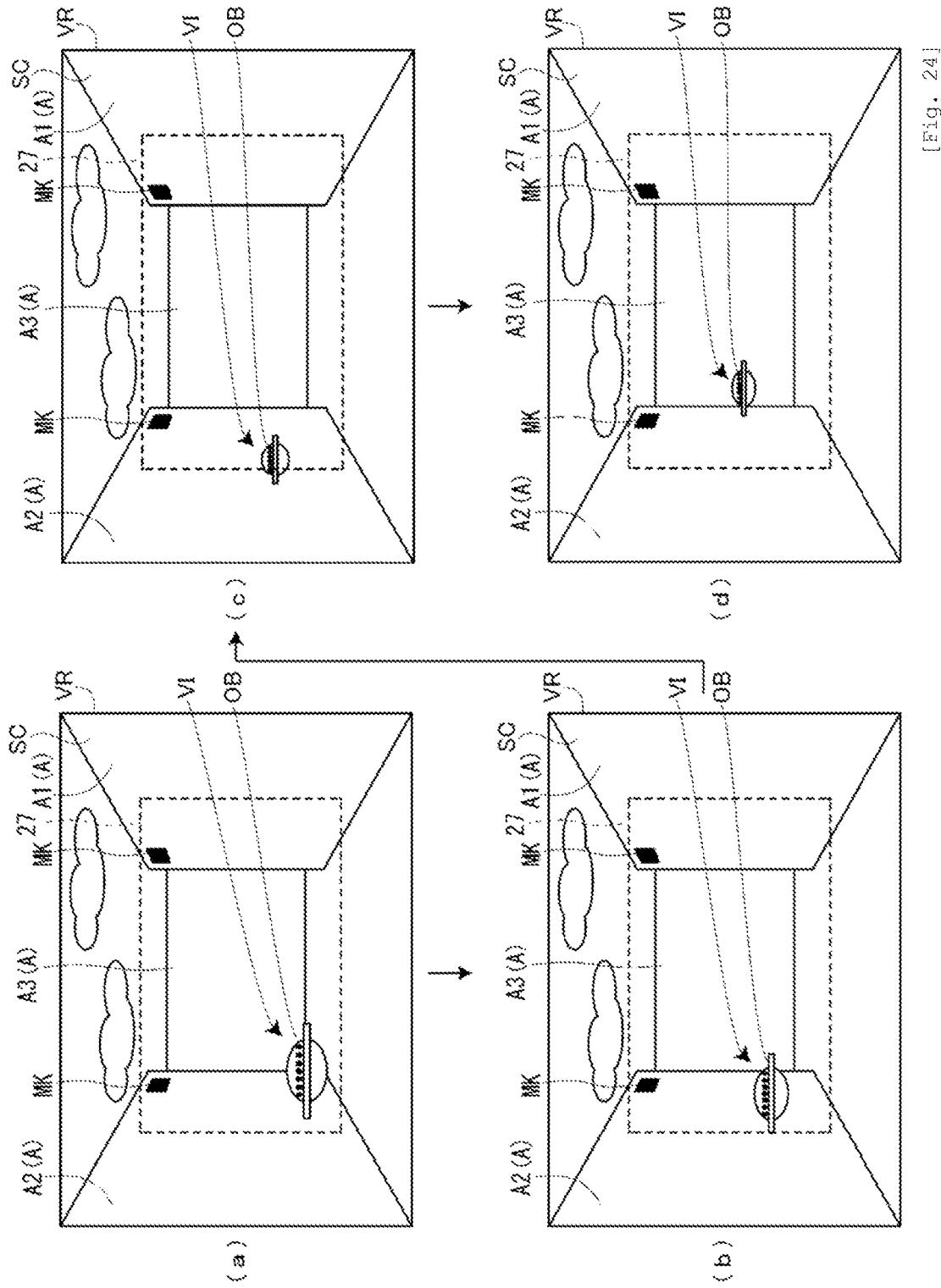

[Fig. 25A]
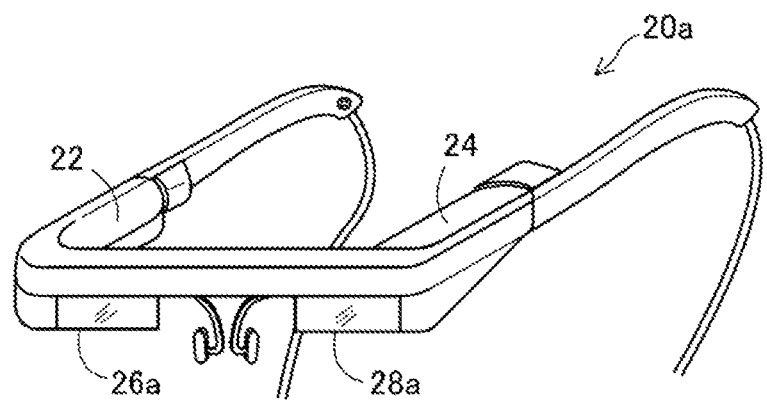
[Fig. 25B]
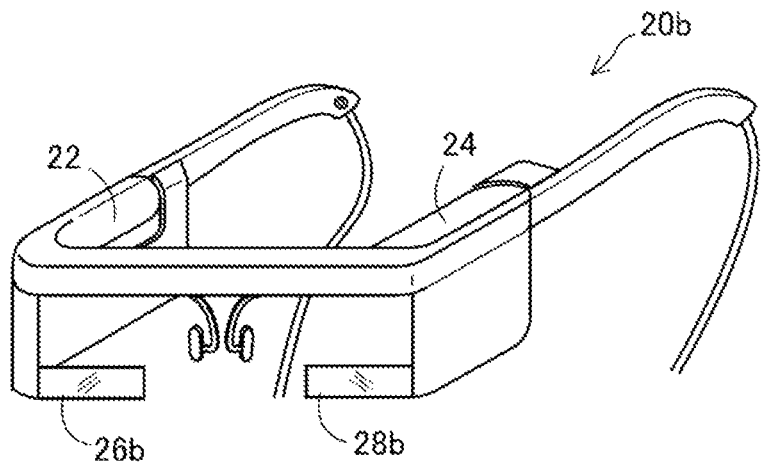

HEAD-MOUNTED DISPLAY DEVICE, CONTROL METHOD OF HEAD-MOUNTED DISPLAY DEVICE, AND DISPLAY SYSTEM

CROSS-REFERENCES TO RELATED APPLICATIONS

The present application is a divisional application of U.S. patent application Ser. No. 14/773,689 filed Sep. 8, 2015, which claims priority from PCT Application No. JP2014-001464 filed Mar. 14, 2014, which claims priority from Japanese Patent Application Nos. 2013-063731 filed Mar. 26, 2013, JP2013-156022 filed Jul. 26, 2013, and JP2013-222143 filed Oct. 25, 2013, which are each expressly incorporated by reference herein.

TECHNICAL FIELD

The present invention relates to a head-mounted display device.

BACKGROUND ART

A head-mounted display device is known which is mounted on a viewer's head for use and forms a virtual image in the viewer's viewing region (see JP-A-2012-163637). Such a head-mounted display device is also called head-mounted display (HMD) and is classified into a non-transmissive head-mounted display device that blocks a user's viewing field in a state where the user wears the head-mounted display device and a transmissive head-mounted display device that does not block a user's viewing field in a state where the user wears the head-mounted display device.

On the other hand, a technique called augmented reality (AR) is known which adds information to a real environment using a computer. As a method of realizing the augmented reality, a method based on image recognition and a method based on a pass-through type are known. In the case of the method based on image recognition, a virtual object is generated, for example, by recognizing an image of an external scene imaged with a WEB camera. In the case of the method based on a pass-through type, a virtual object is generated using current position information acquired, for example, by a GPS, and azimuth information acquired, for example, by an electronic compass. In a non-transmissive head-mounted display device, an image in which the image of the external scene and the virtual object generated in the above-mentioned way overlap with each other is displayed on a liquid crystal display. Accordingly, a user can feel augmented reality. In a transmissive head-mounted display device, only the virtual object generated in the above-mentioned way is displayed on a liquid crystal display. A user can feel augmented reality by visually recognizing both of the virtual object displayed as a virtual image on the liquid crystal display and the actual external scene displayed via lenses in front of the eyes. Accordingly, in order to provide augmented reality with a user's visual discomfort reduced in an optical transmissive head-mounted display device, it is necessary to fit the virtual object displayed as a virtual image to the external scene actually viewed by the user.

Japanese Patent No. 3717653 describes a technique of setting a distance from a user to a real object included in an external scene and a distance from the user to a virtual object to the substantially same distance in order to fit the virtual object to the external scene. In JAPANESE PATENT NO. 3717653, the distance D between a user and a real object is calculated, a convergence angle theta of the real object is determined from the distance D, the convergence angle of the virtual object which is the convergence angle theta of the real object plus-minus 40 arc-minute is computed, and right-eye image data and left-eye image data realizing the computed convergence angle are generated. JP-A-5-328408 describes a technique of capable of adjusting a convergence angle of a virtual object in order to fit the virtual object to an external scene. JP-A-2008-227865 describes a technique of adjusting a camera for capturing an image of an external scene using imaging parameters measured in advance in order to provide augmented reality with a user's visual discomfort reduced in a non-transmissive head-mounted display device.

JP-A-2005-346468 and JP-A-2003-296759 describe a technique of trimming a region of a specific color such as a beige color from an image in a user's eyeline captured with a camera and masking a virtual object in order to reduce discomfort when the virtual object overlaps with an external scene.

SUMMARY OF INVENTION

Technical Problem

In order to stereoscopically display a virtual image of a virtual object with a target convergence angle in a head-mounted display device, it is necessary to consider various conditions of a display environment of a virtual image, such as the size of a liquid crystal display, a distance between virtual images displayed in front of a user's right and left eyes, and a user's interocular distance. However, in the techniques described in Japanese Patent No. 3717653 and JP-A-5-328408, there is a problem in that this point is not sufficiently considered. The technique described in JP-A-2008-227865 is not directed to an optical transmissive head-mounted display device. Accordingly, there is a need for an optical transmissive head-mounted display device that can provide augmented reality with a user's visual discomfort reduced by fitting a virtual object to an external scene in consideration of various conditions on a display environment of a virtual image.

In the techniques described in JP-A-2005-346468 and JP-A-2003-296759, since a virtual object is processed on the basis of an image captured with a camera, there is a problem in that processing accuracy of a virtual object cannot be secured for plural objects having a complex anteroposterior relationship or objects having similar colors, which can be viewed in a real world. Accordingly, there is a need for an optical transmissive head-mounted display device that can provide augmented reality with a user's visual discomfort reduced by fitting a virtual object to an external scene with higher accuracy.

By employing only the configuration in which a virtual object is displayed for visual recognition based on a coordinate system of a real space, there is a problem in that the virtual object behaves in disregard of a real object. For example, when a virtual object is present in a real space, the virtual object passes through a real object in a case where the virtual object collides with the real object. Even in a case where the virtual object is hidden by the real object from a user's point of view, the virtual object is recognized. These phenomena serve as a reason for giving discomfort to a user and markedly damaging a sense of reality.

Therefore, there is a need for an optical transmissive head-mounted display device that can provide augmented reality with a user's visual discomfort reduced.

Solution to Problem

An advantage of some aspects of the invention is to solve at least a part of the problems described above and the invention can be implemented as the following aspects.

(1) An aspect of the invention provides a head-mounted display device that enables a user to visually recognize a virtual image and an external scene. The head-mounted display device includes: an image display unit that causes the user to visually recognize the virtual image; and an augmented reality processing unit that forms on the image display unit the virtual image indicating a virtual object which is an object for providing augmented reality to the user and of which the user's visual discomfort is reduced. In the head-mounted display device according to this aspect, the image display unit causes the user to visually recognize the virtual object, of which the user's visual discomfort is reduced, as a virtual image. Accordingly, it is possible to provide an optical transmissive head-mounted display device which can provide augmented reality with a user's visual discomfort reduced.

(2) In the head-mounted display device according to the aspect, the augmented reality processing unit may reduce the discomfort of the virtual object by fitting the virtual object with an ambient environment of the user using three-dimensional information in which the ambient environment is expressed as a virtual three-dimensional object in a three-dimensional space. In the head-mounted display device according to this aspect, the augmented reality processing unit fits the virtual object with the ambient environment. Accordingly, the image display unit can cause the user to visually recognize the virtual object, of which the user's visual discomfort is reduced, as a virtual image. The augmented reality processing unit fits the virtual object with the ambient environment using the three-dimensional information. Accordingly, it is possible to improve fitting accuracy in comparison with a case where the virtual object is fitted with the ambient environment on the basis of an image captured with a camera.

(3) In the head-mounted display device according to the aspect, the augmented reality processing unit may arrange the virtual object in the three-dimensional information and may reduce the discomfort of the virtual object by adding a visual effect based on the environment to at least one of the virtual object and the three-dimensional information and then converting the virtual object into a two-dimensional image. In the head-mounted display device according to this aspect, the augmented reality processing unit can add the visual effect based on the ambient environment to the virtual object using the three-dimensional information.

(4) In the head-mounted display device according to the aspect, the visual effect based on the environment may include any one of: trimming a portion of the virtual object which is a shadow of the three-dimensional object in the three-dimensional information; lighting the virtual object based on the environment; and adjusting behavior of the virtual object based on at least one of a restitution coefficient and a friction coefficient of the three-dimensional object in the three-dimensional information set on the basis of the environment. In the head-mounted display device according to this aspect, the augmented reality processing unit can add at least one visual effect of the trimming based on the environment, the lighting based on the environment, and the adjusting of behavior based on the environment to the virtual object.

(5) The head-mounted display device according to the aspect may further include an image acquiring unit that acquires an image in the user's viewing field in a state where the user wears the head-mounted display device, and the augmented reality processing unit may estimate the environment by recognizing the image in the viewing field acquired by the image acquiring unit. In the head-mounted display device according to this aspect, the augmented reality processing unit can automatically estimate the ambient environment of the user by recognizing an image in the user's viewing field.

(6) In the head-mounted display device according to the aspect, the augmented reality processing unit may consider a distance from the user's eyes to the user's point of regard to convert the virtual object into a two-dimensional image. In the head-mounted display device according to this aspect, the augmented reality processing unit considers the distance from the user's eyes to the user's point of regard at the time of conversion of the virtual object into a two-dimensional image. Accordingly, it is possible to add a defocus effect to, for example, a virtual object at a position deviated from the user's point of regard.

(7) In the head-mounted display device according to the aspect, the augmented reality processing unit may add a visual effect of enabling a stereoscopic view of the virtual object to the virtual object to reduce the discomfort of the virtual object by generating right-eye image data for a right eye and left-eye image data for a left eye which indicate the virtual object, the image display unit may cause the user's right and left eyes to visually recognize the different virtual images using the right-eye image data and the left-eye image data, the head-mounted display device may further include a pixel parallactic angle storage unit that stores a difference between a first convergence angle of the virtual image displayed on the basis of the right-eye image data and the left-eye image data which are identical to each other and a second convergence angle of the virtual image displayed on the basis of the right-eye image data and the left-eye image data which are laterally deviated from each other, and the augmented reality processing unit may generate the right-eye image data and the left-eye image data for fitting the virtual object to the external scene using the difference stored in the pixel parallactic angle storage unit. In the head-mounted display device according to this aspect, the difference stored in the pixel parallactic angle storage unit is a difference between the first convergence angle of the virtual image displayed on the basis of the right-eye image data and the left-eye image data which are identical to each other and the second convergence angle of the virtual image displayed on the basis of the right-eye image data and the left-eye image data which are laterally deviated from each other. Accordingly, the difference stored in the pixel parallactic angle storage unit can be said to be a parallactic angle which is embodied by the image data which is laterally deviated from each other and which is determined in consideration of various conditions of the display environment of the virtual image. Therefore, the augmented reality processing unit can generate the right-eye image data and the left-eye image data for fitting the virtual object to the external scene in consideration of various conditions of the display environment of the virtual image using the difference stored in the pixel parallactic angle storage unit. In this way, since the augmented reality processing unit fits the virtual object to the external scene in consideration of various conditions of the display environment of a virtual image at the time of generating the image data, it is possible to provide a head-mounted display device which can provide augmented reality with a user's visual discomfort reduced.

(8) In the head-mounted display device according to the aspect, the augmented reality processing unit may determine a target distance at which the user is caused to visually recognize the virtual object, calculate a target convergence angle, which is a convergence angle at the target distance, from the determined target distance, calculate a target parallactic angle which is a parallactic angle at the target distance using the calculated target convergence angle and the first convergence angle, and generate the right-eye image data and the left-eye image data from single image data indicating the virtual object using the target parallactic angle and the difference stored in the pixel parallactic angle storage unit. In the head-mounted display device according to this aspect, the augmented reality processing unit determines the target distance at which the user is caused to visually recognize the virtual object, calculates the target convergence angle which is a convergence angle at the target distance from the determined target distance, and calculates the target parallactic angle which is a parallactic angle at the target distance using the calculated target convergence angle and the first convergence angle. The augmented reality processing unit can generate the right-eye image data and the left-eye image data which are deviated from each other from single image data indicating the virtual object by using the calculated target parallactic angle and the difference stored in the pixel parallactic angle storage unit.

(9) In the head-mounted display device according to the aspect, the augmented reality processing unit may determine a target distance at which the user is caused to visually recognize the virtual object, set two virtual cameras for acquiring a 2D projection image in a 3D model space on the basis of the determined target distance, calculate a target convergence angle, which is a convergence angle at the target distance, from the determined target distance, calculate a target parallactic angle which is a parallactic angle at the target distance using the calculated target convergence angle and the first convergence angle, and generate the right-eye image data by scaling the 2D projection image captured by one virtual camera and may generate the left-eye image data by scaling the 2D projection image captured by the other virtual camera using the target parallactic angle and the difference stored in the pixel parallactic angle storage unit. In the head-mounted display device according to this aspect, the augmented reality processing unit determines the target distance at which the user is caused to visually recognize the virtual object, calculates the target convergence angle which is a convergence angle at the target distance from the determined target distance, and calculates the target parallactic angle which is a parallactic angle at the target distance using the calculated target convergence angle and the first convergence angle. The augmented reality processing unit can generate the right-eye image data and the left-eye image data by respectively scaling the 2D projection images captured by the two virtual cameras using the calculated target parallactic angle and the difference stored in the pixel parallactic angle storage unit.

(10) The head-mounted display device according to the aspect may further include an interocular distance storage unit that stores the user's interocular distance, and the augmented reality processing unit may arrange a virtual viewpoint which is a virtual point of view in the 3D model space on the basis of the determined target distance at the time of setting the two virtual cameras, arrange one virtual camera at a position separated by the interocular distance/2 from the arranged virtual viewpoint, and arrange the other virtual camera at a position separated by the interocular distance/2 from the arranged virtual viewpoint. In the head-mounted display device according to this aspect, the augmented reality processing unit first arranges the virtual viewpoint on the basis of the target distance at which the user is caused to visually recognize the virtual object at the time of setting the virtual cameras in the 3D model space. Then, the augmented reality processing unit arranges one virtual camera at a position separated by the interocular distance/2 from the arranged virtual viewpoint and arranges the other virtual camera at the position separated by the interocular distance/2 from the arranged virtual viewpoint. As a result, the virtual cameras can acquire the 2D projection images in consideration of both the target distance at which the user is caused to visually recognize the virtual object and the user's interocular distance.

(11) The head-mounted display device according to the aspect may further include an interpupillary distance measuring unit that measures the user's interpupillary distance, and the measurement result by the interpupillary distance measuring unit may be stored as the interocular distance in the interocular distance storage unit. In the head-mounted display device according to this aspect, since the interpupillary distance is measured for each user and the interocular distance storage unit is updated, it is possible to store the interpupillary distance of each user in the interocular distance storage unit.

(12) The head-mounted display device according to the aspect may further include an object detecting unit that detects a coordinate position and a shape of a real object in a real space, and the augmented reality processing unit may reduce the discomfort of the virtual object by controlling the virtual object, of which a coordinate position in the real space is set, on the basis of the coordinate position and the shape of the real object. In the head-mounted display device according to this aspect, since the virtual object can be caused to behave in consideration of the coordinate position or the shape of a real object, it is possible to solve the above-mentioned phenomena and to improve a sense of reality. That is, in a case where a virtual object collides with a real object, the virtual object can be caused to behave as if the virtual object collided with the real object. In a case where a virtual object is hidden by a real object from the user's viewpoint, the virtual object can be changed as if the virtual object were hidden by the real object.

(13) In the head-mounted display device according to the aspect, the augmented reality processing unit may control behavior of the virtual object on the basis of the coordinate position and the shape of the real object. In the head-mounted display device according to this aspect, it is possible to provide contents coupled to real objects in a transmissive display device by causing the virtual object to behave in consideration of the coordinate position or the shape of the real object. For example, it is possible to provide games or navigation services in which virtual objects are coupled to real objects.

(14) In the head-mounted display device according to the aspect, the augmented reality processing unit may change the virtual object on the basis of the detected coordinate position of the real object and the set coordinate position of the virtual object so as to make an overlapping portion of the virtual object with the real object disappear when the virtual object is located in the back of the real object from the user's viewpoint.

(15) In the head-mounted display device according to the aspect, the augmented reality processing unit may cause the virtual object to behave so as to avoid the real object in a coordinate system of a real space.

(16) In the head-mounted display device according to the aspect, the augmented reality processing unit may cause the virtual object to behave as if the virtual object collided with the real object when the virtual object moves and reaches the real object in the coordinate system of the real space.

(17) The head-mounted display device according to the aspect may further include an eyeline detecting unit that detects the user's eyeline, and the augmented reality processing unit may display the virtual object on the basis of the detected eyeline. In the head-mounted display device according to this aspect, it is possible to fit the virtual object with higher accuracy by displaying the virtual object in consideration of the user's eyeline.

(18) The head-mounted display device according to the aspect may further include a distance detecting unit that detects a distance from the user to the real object, and the augmented reality processing unit may display the virtual object on the basis of the detected distance. In the head-mounted display device according to this aspect, it is possible to fit the virtual object with higher accuracy by displaying the virtual object in consideration of the distance from the user to the real object.

(19) In the head-mounted display device according to the aspect, the image display unit may include: an image light output unit that outputs image light of the image; and a light guide section that guides the output image light to the user's eyes, and the light guide section may transmit external light and cause the external light along with the image light to be incident on the user's eyes. In the head-mounted display device according to this aspect, it is possible to fit the virtual object with higher accuracy and thus to improve a sense of reality by using a so-called virtual image projection type of transmissive display device.

All the elements in the aspects of the invention are not essential. In order to solve all or a part of the above-mentioned problems or to achieve all or a part of the effects described in this specification, some elements may be appropriately subjected to change, deletion, replacement with new elements, and partial deletion of defined details. In order to solve all or a part of the above-mentioned problems or to achieve all or a part of the effects described in this specification, all or a part of technical features included in one aspect of the invention may be combined with all or a part of technical features included in another aspect of the invention to constitute an independent aspect of the invention.

For example, an aspect of the invention may be embodied as a device including one or both of the augmented reality processing unit and the image display unit. That is, this device may have or may not have the augmented reality processing unit. This device may have or may not have the image display unit. This device can be embodied, for example, as a head-mounted display device, but may be embodied as another device other than the head-mounted display device. All or a part of the technical features in the above-mentioned aspects of the head-mounted display device can be applied to this device.

The invention can be embodied in various aspects and can be embodied, for example, in aspects such as a head-mounted display device, a control method of a head-mounted display device, a head-mounted display system, a computer program for performing the method or the functions of the device or system, and a recording medium having the computer program recorded thereon.

BRIEF DESCRIPTION OF DRAWINGS

FIG. 1 is a diagram schematically illustrating a configuration of a head-mounted display device according to an embodiment of the invention.

FIG. 2 is a block diagram illustrating a functional configuration of the head-mounted display device.

FIG. 3A is a diagram illustrating an example of a virtual image which is visually recognized by a user.

FIG. 3B is a diagram illustrating an example of a virtual image which is visually recognized by a user.

FIG. 4 is a diagram illustrating an augmented reality processing procedure.

FIG. 5 is a diagram illustrating an interocular distance and a pixel parallactic angle.

FIG. 6A is a diagram illustrating a state in which an AR processing unit generates right-eye image data and left-eye image data from image data.

FIG. 6B is a diagram illustrating a state in which an AR processing unit generates right-eye image data and left-eye image data from image data.

FIG. 7 is a flowchart illustrating an augmented reality processing procedure according to a second embodiment.

FIG. 8 is a diagram illustrating details of the augmented reality processing procedure according to the second embodiment.

FIG. 9 is a diagram illustrating a state in which an AR processing unit scales an image acquired by projection using a 2D projection image of a virtual camera disposed at a virtual viewpoint.

FIG. 10 is a flowchart illustrating an augmented reality processing procedure according to a third embodiment.

FIG. 11 is a block diagram illustrating a functional configuration of the head-mounted display device according to the second embodiment.

FIG. 12 is a flowchart illustrating an augmented reality processing procedure according to the second embodiment.

FIG. 13A is a diagram illustrating a mask object.

FIG. 13B is a diagram illustrating a mask object.

FIG. 14 is a diagram illustrating an example of arrangement of a virtual object relative to a mask object.

FIG. 15 is a diagram illustrating a state of a virtual object having been subjected to lighting.

FIG. 16 is a diagram illustrating a state where behavior of a virtual object is adjusted on the basis of a restitution coefficient and a friction coefficient.

FIG. 17 is a diagram illustrating image data acquired by 2D projection of a virtual camera.

FIG. 18 is a diagram illustrating an example of a virtual image which is visually recognized by a user in the augmented reality processing procedure according to the second embodiment.

FIG. 19 is a diagram illustrating an example of a virtual image and a real scene which can be visually recognized by a user.

FIG. 20 is a block diagram illustrating a control configuration of a head-mounted display device.

FIG. 21 is a flowchart illustrating an augmented reality processing procedure according to the third embodiment.

FIG. 22 is a transition diagram illustrating a first example of behavior control of a virtual object according to the third embodiment.

FIG. 23 is a transition diagram illustrating a second example of the behavior control of a virtual object according to the third embodiment.

FIG. 24 is a transition diagram illustrating a third example of the behavior control of a virtual object according to the third embodiment.

FIG. 25A is a diagram illustrating an outer configuration of a head-mounted display according to a modification example.

FIG. 25B is a diagram illustrating an outer configuration of a head-mounted display according to a modification example.

DESCRIPTION OF EMBODIMENTS

A. First Embodiment

A-1. Configuration of Head-Mounted Display Device

FIG. 1 is a diagram schematically illustrating a configuration of a head-mounted display device according to an embodiment of the invention. The head-mounted display device 100 is a display device mounted on a head and is also referred to as a head-mounted display (HMD). The head-mounted display 100 according to this embodiment is an optical transmissive head-mounted display device which enables a user to directly visually recognize an external scene at the same time as visually recognizing a virtual image.

The head-mounted display 100 includes an image display unit 20 that causes a user to visually recognize a virtual image in a state where the user wears the head-mounted display and a control unit (controller) 10 that controls the image display unit 20.

The image display unit 20 is a wearing member that is mounted on a user's head and has a glasses-like shape in this embodiment. The image display unit 20 includes a right support 21, a right display drive unit 22, a left support 23, a left display drive unit 24, a right optical image display unit 26, a left optical image display unit 28, a camera 61, and an interpupillary distance measuring unit 62. The right optical image display unit 26 and the left optical image display unit 28 are disposed to be located in front of a user's right and left eyes, respectively, when the user wears the image display unit 20. One end of the right optical image display unit 26 and one end of the left optical image display unit 28 are connected to each other at a position between the user's eyebrows when the user wears the image display unit 20.

The right support 21 is a member which extends from an end portion ER which is the other end of the right optical image display unit 26 over a position corresponding to the user's lateral head when the user wears the image display unit 20. Similarly, the left support 23 is a member which extends from an end portion EL which is the other end of the left optical image display unit 28 over a position corresponding to the user's lateral head when the user wears the image display unit 20. The right support 21 and the left support 23 support the image display unit 20 on the user's head like glass temples (temples).

The right display drive unit 22 is disposed inside the right support 21, that is, on a side facing the user's head when the user wears the image display unit 20. The left display drive unit 24 is disposed inside the left support 23. In the following description, the right support 21 and the left support 23 are generically simply referred to as a "support", the right display drive unit 22 and the left display drive unit 24 are generically simply referred to as a "display drive unit", and the right optical image display unit 26 and the left optical image display unit 28 are generically simply referred to as an "optical image display unit".

The display drive unit includes liquid crystal displays (hereinafter, referred to as "LCD") 241 and 242 or projection optical systems 251 and 252 (see FIG. 2). The detailed configuration of the display drive unit will be described later. The optical image display unit as an optical member includes light guide plates 261 and 262 (see FIG. 2) and light control plates. The light guide plates 261 and 262 are formed of a light-transmitting resin material and guide image light output from the display drive unit to the user's eyes. The light control plates are thin-plate optical elements and are disposed to cover the front side (the side opposite to the user's eyes) of the image display unit 20. The light control plates protect the light guide plates 261 and 262 and suppress damage or contamination of the light guide plates 261 and 262. By adjusting optical transmittance of the light control plates, it is possible to adjust an amount of external light incident on the user's eyes so as to easily visually recognize a virtual image. The light control plates may be skipped.

The camera 61 is disposed at a position between the user's eyebrows when the user wears the image display unit 20. The camera 61 images an external scene (external scene) on the front side of the image display unit 20, that is, in the user's viewing field in a state where the user wears the head-mounted display 100, and acquires an external scene image. The camera 61 is a so-called visible-light camera and the external scene image acquired by the camera 61 is an image in which a shape of an object is displayed by visible light emitted from the object. The camera 61 in this embodiment is a monocular camera, but may be a stereoscopic camera. The camera 61 serves as the "image acquiring unit".

The interpupillary distance measuring unit 62 measures a user's interpupillary distance. The interpupillary distance is a distance between the center of the iris of the user's right eye RE and the center of the iris of the user's left eye LE. As illustrated in FIG. 1, the interpupillary distance measuring unit 62 includes two cameras that are disposed on the inner surface of the image display unit 20 and that capture images of the user's right eye RE and left eye LE, respectively, and a processing unit that analyzes the captured images, for example, using a triangulation method and that calculates the distance between the centers of the irises of the right and left eyes. The interpupillary distance measuring unit 62 may measure the user's interpupillary distance using ultrasonic waves or infrared rays instead of the camera. The interpupillary distance measuring unit 62 may measure the user's interpupillary distance by combining the above-mentioned multiple methods.

The image display unit 20 includes a connecting section 40 that connects the image display unit 20 to the control unit 10. The connecting section 40 includes a main cord 48 that is connected to the control unit 10, two cords of a right cord 42 and a left cord 44 into which the main cord 48 is branched, and a connecting member 46 that is disposed at the branching point. The right cord 42 is inserted into a chassis of the right support 21 from a tip portion AP in the extending direction of the right support 21 and is connected to the right display drive unit 22. Similarly, the left cord 44 is inserted into a chassis of the left support 23 from a tip portion AP in the extending direction of the left support 23 and is connected to the left display drive unit 24. The connecting member 46 is provided with a jack for connection to an earphone plug 30. A right earphone 32 and a left earphone 34 extend from the earphone plug 30.

The image display unit 20 and the control unit 10 transmit various signals via the connecting section 40. An end portion of the main cord 48 opposite to the connecting section 46 and the control unit 10 are provided with connectors (not illustrated) engaging with each other, respectively, and the control unit 10 and the image display unit 20 are connected to or disconnected from each other by engagement or disengagement between the connector of the main cord 48 and the connector of the control unit 10. The right cord 42, the left cord 44, and the main cord 48 can employ, for example, a metal cable or an optical fiber.

The control unit 10 is a unit that controls the head-mounted display 100. The control unit 10 includes a lighting unit 12, a touch pad 14, a cross key 16, and a power supply switch 18. The lighting unit 12 notifies the operation state (for example, ON/OFF of a power source) of the head-mounted display 100 using light-emitting forms thereof.

The lighting unit 12 can employ, for example, a light emitting diode (LED). The touch pad 14 detects a touch operation on an operation surface of the touch pad 14 and outputs a signal corresponding to the detected details. The touch pad 14 can employ various touch pads such as an electrostatic type, a pressure detection type, and an optical type. The cross key 16 detects a pressing operation against keys corresponding to vertical and horizontal directions and outputs a signal corresponding to the detected details. The power supply switch 18 switches the power supply state of the head-mounted display 100 by detecting a sliding operation on the switch.

FIG. 2 is a block diagram illustrating a functional configuration of the head-mounted display 100. The control unit 10 includes an input information acquiring unit 110, a storage unit 120, a power supply 130, a wireless communication unit 132, a GPS module 134, a CPU 140, an interface 180, and transmitter units (Tx) 51 and 52. The units are connected to each other via a bus not illustrated.

The input information acquiring unit 110 acquires a signal corresponding to an operation input to, for example, the touch pad 14, the cross key 16, or the power supply switch 18. The storage unit 120 is formed of a ROM, a RAM, a DRAM, a hard disk, or the like. The storage unit 120 includes an interocular distance 122 and a pixel parallactic angle 124. Details thereof will be described later. The power supply 130 supplies power to the respective units of the head-mounted display 100. For example, a secondary battery can be used as the power supply 130. The wireless communication unit 132 wirelessly communicates with other devices on the basis of a predetermined wireless communication protocol such as a wireless LAN or a Bluetooth. The GPS module 134 detects its current position by receiving a signal from GPS satellites.

The CPU 140 serves as an operating system (OS) 150, an image processing unit 160, a sound processing unit 170, a display control unit 190, and an AR processing unit 142 by reading and executing computer programs stored in the storage unit 120. The AR processing unit 142 performs a process (hereinafter, also referred to as "augmented reality processing") of realizing augmented reality using a process start request from the OS 150 or a specific application as a trigger. Details thereof will be described later. The AR processing unit 142 corresponds to the "augmented reality processing unit" in the appended claims.

The image processing unit 160 generates a signal on the basis of contents (image) input via the interface 180 or the wireless communication unit 132. Then, the image processing unit 160 supplies the generated signal to the image display unit 20 via the connecting section 40. The signal to be supplied to the image display unit 20 has a difference between an analog type and a digital type. In the case of the analog type, the image processing unit 160 generates and transmits a clock signal PCLK, a vertical synchronization signal VSync, a horizontal synchronization signal HSync, and image data Data. Specifically, the image processing unit 160 acquires an image signal included in the contents. For example, in the case of a moving image, the acquired image signal is generally an analog signal including 30 frame images per second. The image processing unit 160 separates a synchronization signal such as the vertical synchronization signal VSync or the horizontal synchronization signal HSync from the acquired image signal, and generates the clock signal PCLK through the use of a PLL circuit or the like on the basis of the period of the synchronization signal. The image processing unit 160 converts the analog image signal from which the synchronization signal is separated into a digital image signal by the use of an A/D conversion circuit or the like. The image processing unit 160 stores the converted digital image signal as the image data Data of RGB data in the DRAM of the storage unit 120 for each frame. On the other hand, in the case of the digital type, the image processing unit 160 generates and transmits the clock signal PCLK and the image data Data. Specifically, when the contents are of a digital type, the clock signal PCLK is output in synchronization with the image signal and thus the generation of the vertical synchronization signal VSync and the horizontal synchronization signal HSync and the A/D conversion of the analog image signal are not necessary. The image processing unit 160 may perform various color correcting processes such as a resolution converting process and adjustment of luminance and chroma and image processing such as a keystone correcting process on the image data Data stored in the storage unit 120.

The image processing unit 160 transmits the generated clock signal PCLK, vertical synchronization signal VSync, and horizontal synchronization signal HSync and the image data Data stored in the DRAM of the storage unit 120 via the transmitter units 51 and 52. The image data Data transmitted via the transmitter unit 51 is also referred to as "right-eye image data Data1" and the image data Data transmitted via the transmitter unit 52 is also referred to as "left-eye image data Data2". The transmitter units 51 and 52 serve as transceivers for serial transmission between the control unit 10 and the image display unit 20.

The display control unit 190 generates a control signal for controlling the right display drive unit 22 and the left display drive unit 24. Specifically, the display control unit 190 controls generation and emission of image light from the right display drive unit 22 and the left display drive unit 24 by individually controlling drive ON/OFF of a right LCD 241 by a right LCD control unit 211, drive ON/OFF of a right backlight 221 by a right backlight control unit 201, drive ON/OFF of a left LCD 242 by a left LCD control unit 212, and drive ON/OFF of a left backlight 222 by a left backlight control unit 202 using the control signal. For example, the display control unit 190 causes both the right display drive unit 22 and the left display drive unit 24 to generate image light, causes only any one thereof to generate image light, or causes both thereof not to generate image light. The display control unit 190 transmits the control signals for the right LCD control unit 211 and the left LCD control unit 212 via the transmitter units 51 and 52, respectively. The display control unit 190 transmits the control signals for the right backlight control unit 201 and the left backlight control unit 202, respectively.

The sound processing unit 170 acquires a sound signal included in the contents, amplifies the acquired sound signal, and supplies the amplified sound signal to a speaker (not illustrated) in the right earphone 32 connected to the connecting member 46 and a speaker (not illustrated) in the left earphone 34 connected to the connecting member. For example, when a Dolby (registered trademark) system is employed, the sound signal is processed and different sounds having, for example, changed frequencies are output from the right earphone 32 and the left earphone 34.

The interface 180 is an interface for connecting various external devices OA as a source of contents to the control unit 10. Examples of the external device OA include a personal computer PC, a mobile terminal, and a game terminal. For example, a USB interface, a micro USB interface, and a memory-card interface can be used as the interface 180.

The image display unit 20 includes a right display drive unit 22, a left display drive unit 24, a right light guide plate 261 as the right optical image display unit 26, a left light guide plate 262 as the left optical image display unit 28, a camera 61, and a 9-axis sensor 66.

The 9-axis sensor 66 is a motion sensor that detects accelerations (three axes), angular velocities (three axes), and terrestrial magnetism (three axes). The 9-axis sensor 66 is disposed in the image display unit 20. Accordingly, when the image display unit 20 is mounted on a user's head, the 9-axis sensor serves as a movement detecting unit that detects movement of the user's head. Here, the movement of a head includes a velocity, an acceleration, an angular velocity, a direction, and a variation in direction of the head.

The right display drive unit 22 includes a receiver unit (Rx) 53, a right backlight (BL) control unit 201 and a right backlight (BL) 221 serving as a light source, a right LCD control unit 211 and a right LCD 241 serving as a display element, and a right projection optical system 251. The right backlight control unit 201, the right LCD control unit 211, the right backlight 221, and the right LCD 241 are also generically referred to as an "image light generating unit".

The receiver unit 53 serves as a receiver for serial transmission between the control unit 10 and the image display unit 20. The right backlight control unit 201 drives the right backlight 221 on the basis of the input control signal. The right backlight 221 is a light-emitting member such as an LED or an electroluminescence (EL). The right LCD control unit 211 drives the right LCD 241 on the basis of the clock signal PCLK, the vertical synchronization signal VSync, the horizontal synchronization signal HSync, and the right-eye image data Data1 input via the receiver unit 53. The right LCD 241 is a transmissive liquid crystal panel in which plural pixels are arranged in a matrix shape. The right LCD 241 modulates illumination light emitted from the right backlight 221 to effective image light indicating an image by driving the liquid crystal at the pixel positions arranged in the matrix shape to change transmittance of light passing through the right LCD 241. In this embodiment, the backlight type is employed, but image light may be emitted using a front-light type or a reflection type.

The right projection optical system 251 includes a collimator lens that changes the image light emitted from the right LCD 241 to a parallel light beam. The right light guide plate 261 as the right optical image display unit 26 guides the image light output from the right projection optical system 251 to the user's right eye RE while reflecting the image light along a predetermined optical path. The optical image display unit may employ any method as long as it can form a virtual image in front of the user's eyes using image light. For example, a diffraction grating or a semi-transmissive film may be used.

The left display drive unit 24 has the same configuration as the right display drive unit 22. That is, the left display drive unit 24 includes a receiver unit (Rx) 54, a left backlight (BL) control unit 202 and a left backlight (BL) 222 serving as a light source, a left LCD control unit 212 and a left LCD 242 serving as a display element, and a left projection optical system 252.

FIGS. 3A and 3B are diagrams illustrating an example of a virtual image which is visually recognized by a user. FIG. 3A illustrates a user's viewing field VR which is subjected to a normal display process. As described above, the image light guided to the user's eyes in the head-mounted display 100 is focused on the user's retinas, whereby the user visually recognizes the virtual image VI. In the example illustrated in FIG. 3A, the virtual image VI is a standby screen of the OS of the head-mounted display 100. The user visually recognizes an external scene SC through the right optical image display unit 26 and the left optical image display unit 28.

In this way, the user of the head-mounted display 100 according to this embodiment can view the virtual image VI and the external scene SC in the back of the virtual image VI in a portion of the viewing field VR in which the virtual image VI is displayed. In a portion of the viewing field VR in which the virtual image VI is not displayed, the user can directly view the external scene SC through the optical image display unit. In this specification, "the head-mounted display 100 displays an image" includes causing the user of the head-mounted display 100 to visually recognize a virtual image as described above.

FIG. 3B illustrates a user's viewing field VR which is subjected to the augmented reality processing. In the augmented reality processing, the AR processing unit 142 of the head-mounted display 100 forms a virtual image indicating a virtual object, which is used to augment an external scene SC recognized by a user and of which the user's visual discomfort is reduced, on the image display unit 20. Specifically, the AR processing unit 142 generates image data in which a visual effect capable of reducing the user's visual discomfort is added to the virtual object and transmits the generated image data to the image display unit 20. "To augment the external scene SC" means to add, delete, emphasize, and attenuate information of a real environment, that is, an external scene SC, which is viewed by the user. In the augmented reality processing according to the first embodiment, in order to fit the virtual object to the external scene SC, the AR processing unit 142 adds a visual effect enabling a stereoscopic view of the virtual object by generating the right-eye image data Data1 and the left-eye image data Data 2 which are different from each other. "To fit a virtual object to an external scene" means to display a virtual image VI which gives a user such a sense that the virtual object is present at a position separated by a predetermined distance (hereinafter, also referred to as a "target distance") from the user in the external scene SC which is actually viewed by the user. In the example illustrated in FIG. 3B, an image of an apple is displayed as a virtual image VI so as to overlap with a real road included in the external scene SC. Accordingly, the user can feel such a sense that the apple lies on the road having nothing. In the example illustrated in FIG. 3B, the distance between the position of the user and the position at which the user feels "an apple lies" corresponds to the target distance. In the example illustrated in FIG. 3B, the apple corresponds to the virtual object OB.

A-2. Augmented Reality Processing (First Example)

The AR processing unit 142 performs an augmented reality processing procedure using the following procedures a1 to a3.

(a1) The target distance at which a virtual object is visually recognized is determined.

(a2) Image data indicating the virtual object is generated.

(a3) Right-eye image data Data1 and left-eye image data Data2 are generated from the image data.

FIG. 4 is a diagram illustrating the augmented reality processing procedure. When the image processing unit 160 supplies the image display unit 20 with the right-eye image data Data1 and the left-eye image data Data2 which are identical to each other, the user recognizes an object at a position CO1 separated by an initial imaging distance La from the user. At this time, a convergence angle is referred to as an "initial convergence angle theta a". In the procedure a1, the AR processing unit 142 determines the target distance Lb at which the user is caused to visually recognize the virtual object OB so as to enable displaying of the virtual object OB having a sense of perspective. The AR processing unit 142 can determine the target distance Lb, for example, using any method of the following methods.

An external scene in the user's viewing field acquired by the camera 61 is analyzed.

A current position coordinate of the user and movement of the user's head are analyzed. In this case, the current position coordinate of the user is acquired from position information of the control unit 10 detected by the GPS module 134. The movement of the user's head is acquired from movement information detected by the 9-axis sensor 66.

In the procedure a2, the AR processing unit 142 generates image data indicating the virtual object OB. In the augmented reality processing according to the first example, the AR processing unit 142 acquires image data based on the analysis result of the procedure a1 from plural image data pieces stored in advance in the storage unit 120.

In the procedure a3, the AR processing unit 142 generates the right-eye image data Data1 and the left-eye image data Data2 from the image data generated in the procedure a2. At this time, the AR processing unit 142 uses the pixel parallactic angle 124 stored in the storage unit 120.

FIG. 5 is a diagram illustrating the interocular distance 122 and the pixel parallactic angle 124. In this embodiment, the interocular distance 122 is considered as the distance between the center of the right optical image display unit 26 and the center of the left optical image display unit 28 as the distance DL between the user's right eye RE and left eye LE. Accordingly, the distance (for example, 65 mm) between the center of the right optical image display unit 26 and the center of the left optical image display unit 28 based on the design value of the head-mounted display 100 is stored in advance in the interocular distance 122. The actual distance DL between the user's right eye RE and left eye LE may be stored in the interocular distance 122. Details thereof will be described in a second example of the augmented reality processing. The interocular distance 122 may be adjusted depending on a user's taste. The interocular distance 122 corresponds to the "interocular distance storage unit" in the appended claims.

The pixel parallactic angle 124 is a parallactic angle which is realized by image data deviated laterally by one pixel and is expressed in theta pix(degree). The pixel par-allactic angle 124 is a difference between a convergence angel of a virtual image displayed on the basis of the image data which are laterally identical to each other and a convergence angel of a virtual image displayed on the basis of the image data which are laterally deviated by one pixel from each other. Theta pix is calculated as follows and is stored in advance in the pixel parallactic angle 124.

The initial convergence angle theta a is measured when the right LCD 241 and the left LCD 242 are driven on the basis of the right-eye image data Data1 and the left-eye image data Data2 which are identical to each other.

The convergence angle theta c is measured when the right LCD 241 and the left LCD 242 are driven on the basis of the right-eye image data Data1 and the left-eye image data Data2 which are deviated by one pixel.

The difference between the initial convergence angle theta a and the convergence angle theta c is calculated (theta c−theta a). In general, since theta c>theta a is assumed, it is assumed herein that the initial convergence angle theta a is subtracted from the convergence angle theta.

In order to obtain a convergence angle difference for each eye, the difference between the initial convergence angle theta a and the convergence angle theta c is divided by 2.

That is, the pixel parallactic angle can be expressed by theta pix=(theta c−theta a)/2. The initial convergence angle theta a corresponds to the "first convergence angle" in the appended claims, the convergence angle theta c corresponds to the "second convergence angle" in the appended claims, and the pixel parallactic angle 124 corresponds to the "pixel parallactic angle storage unit" in the appended claims.

Referring to FIG. 4 again, the augmented reality processing procedure will be described below. The target distance Lb (the distance at which the user can be caused to visually recognize the virtual object OB) determined in the procedure a1, the convergence angle theta b at that time, and the interocular distance 122 (DL/2) can be expressed by Expression (1) using a trigonometrical function. Accordingly, the AR processing unit 142 applies the target distance Lb determined in the procedure a1 and the interocular distance 122 to Expression (1) to calculate the target convergence angle theta b.

[Math. 1]

$\tan(\theta b/2)=(DL/2)/Lb$ $\tan(\theta b/2)=DL/(2\times Lb)$ $\theta b/2=\arctan\{DL/(2\times Lb)\}$ $\theta b=2\times\arctan\{DL/(2\times Lb)\}$ (1)

The AR processing unit 142 calculates a target parallactic angle theta x which is a parallactic angle at the target distance Lb (the distance at which the user is caused to visually recognize the virtual object OB) using the calculated target convergence angle theta b and the initial convergence angle theta a. Specifically, the AR processing unit 142 applies the values of the initial convergence angle theta a and the target convergence angle theta b to Expression (2) to calculate the target parallactic angle theta x.

[Math. 2]

$\theta x=(\theta b-\theta a)/2$ (2)

In Expression (2), for example, when the set position is infinity, theta x is expressed by theta x=−theta a/2.

The AR processing unit 142 processes the image data in the procedure a2 using the calculated target parallactic angle theta x and the pixel parallactic angle 124 and generates the right-eye image data Data1 and the left-eye image data Data2. Specifically, theta pix stored in the pixel parallactic angle 124 is a parallactic angle which is realized by the image data laterally deviated by one pixel. Accordingly, in order to generate the right-eye image data Data1 for realizing the target parallactic angle theta x, the basic image data can be deviated to the left by theta x/theta pix pixels. Similarly, in order to generate the left-eye image data Data2 for realizing the target parallactic angle theta x, the basic image data can be deviated to the right by theta x/theta pix pixels.

FIGS. 6A and 6B illustrate a state where the AR processing unit 142 generates the right-eye image data Data1 and the left-eye image data Data2 from the image data DT.

The AR processing unit 142 transmits the right-eye image data Data1 and the left-eye image data Data2 generated as described above to the image processing unit 160. The image processing unit 160 transmits the received right-eye image data Data1 to the image display unit 20 via the transmitter unit 51.

Similarly, the image processing unit transmits the received left-eye image data Data2 to the image display unit 20 via the transmitter unit 52. Thereafter, the display process described with reference to FIG. 2 is performed. As illustrated in FIG. 3B, the user of the head-mounted display 100 can visually recognize the stereoscopic virtual object OB in the viewing field VR.

The resolution of a person with an eyesight of 1.0 can be expressed by arctan(1.5 mm/5000 mm) and is about 0.017 degree. Therefore, when the error between the virtual image VI displayed on the basis of the right-eye image data Data1 and the left-eye image data Data2 and the external scene SC is designed to be 0.017 degree or less, it is possible to display the virtual image VI with an actual size based on the external scene SC.

As described above, in the augmented reality processing according to the first example, since the augmented reality processing unit (AR processing unit 142) fits the virtual object OB to the external scene SC in consideration of various conditions (the sizes of the right LCD 241 and the left LCD 242 and the distance between the virtual images VI displayed in front of the user's right and left eyes) on the display environment of the virtual image VI at the time of generating the image data (the right-eye image data Data1 and the left-eye image data Data2), it is possible to implement a head-mounted display device (head-mounted display 100) which can provide augmented reality with a user's visual discomfort reduced. Specifically, the difference (theta pix) stored in the pixel parallactic angle storage unit (pixel parallactic angle 124) is a difference between the first convergence angle theta a (initial convergence angle theta a) of the virtual image VI displayed on the basis of the right-eye image data Data1 and the left-eye image data Data2 which are identical to each other and the second convergence angle theta c of the virtual image displayed on the basis of the right-eye image data Data1 and the left-eye image data Data2 which are laterally deviated by one pixel. Accordingly, the difference (theta pix) stored in the pixel parallactic angle storage unit (pixel parallactic angle 124) is a parallactic angle which is realized by the image data laterally deviated by one pixel and is also a parallactic angle determined in consideration of various conditions on the display environment of the virtual image VI, that is, the conditions such as the sizes of the right LCD 241 and the left LCD 242 and the distance between the virtual images VI displayed in front of the user's right and left eyes. Therefore, the augmented reality processing unit (AR processing unit 142) can generate the right-eye image data Data1 and the left-eye image data Data2 for fitting the virtual object OB to the external scene SC in consideration of various conditions on the display environment of the virtual image VI using the pixel parallactic angle stored in the pixel parallactic angle storage unit (pixel parallactic angle 124).

In the augmented reality processing according to the first example, the augmented reality processing unit (AR processing unit 142) determines the target distance Lb at which the user is caused to visually recognize the virtual object OB, calculates the target convergence angle theta b which is a convergence angle at the target distance Lb from the determined target distance Lb, and calculates the target parallactic angle theta x which is a parallactic angle at the target distance Lb using the calculated target convergence angle theta b and the first convergence angle theta a (initial convergence angle theta a). The augmented reality processing unit (AR processing unit 142) can generate the right-eye image data Data1 and the left-eye image data Data2 which are deviated from each other from single image data DT (see FIGS. 6A and 6B) indicating the virtual object OB using the calculated target parallactic angle theta x and the difference (theta pix) stored in the pixel parallactic angle storage unit (pixel parallactic angle 124).

A-3. Augmented Reality Processing (Second Example)

In the augmented reality processing according to a second example, the AR processing unit 142 generates image data indicating a virtual object based on a user's movement from a virtual three-dimensional object in a three-dimensional (3D) model space and generates the right-eye image data Data1 and the left-eye image data Data2 from the generated image data. The augmented reality processing according to this example is different from the augmented reality processing according to the first example, in that the procedure illustrated in FIG. 7 is performed instead of the procedures a2 and a3. The procedure a1 is the same as in the first example and thus will not be repeatedly described.

FIG. 7 is a flowchart illustrating an augmented reality processing procedure according to the second example. The AR processing unit 142 initially sets the interocular distance 122 (step S102). Specifically, the AR processing unit 142 acquires a user's interpupillary distance measured by the interpupillary distance measuring unit 62 (see FIG. 2) and stores the acquired distance in the interocular distance 122. In this way, according to step S102, the user's interpupillary distance can be stored in the interocular distance 122.

FIG. 8 is a diagram illustrating details of the augmented reality processing procedure according to the second example. In step S104 of FIG. 7, the AR processing unit 142 sets a virtual viewpoint at a predetermined position in the 3D model space. Specifically, the AR processing unit 142 sets the virtual viewpoint IV at a position separated by the distance Lb calculated in the procedure a1 from a virtual object OB1 in the 3D model space (FIG. 8). The virtual viewpoint IV is located as a position corresponding to the user's temple, and the direction of the virtual viewpoint IV (viewpoint direction VD) is directed to the virtual object OB1. The position of the virtual viewpoint IV is defined by a shift (x, y, z) with respect to the origin coordinate in the 3D model space. The viewpoint direction VD is defined by an angle (theta x, theta y, theta z) with respect to the virtual viewpoint IV. (theta x, theta y, theta z) is expressed by (roll angle, pitch angle, yaw angle)=(phi, theta, psi). After setting the virtual viewpoint IV, the AR processing unit 142 performs the processes of steps S110 to S116 and the processes of steps S120 to S126 in parallel.

After setting the virtual viewpoint IV, the AR processing unit 142 sets a virtual camera CML at a position corresponding to the left eye on the basis of the position and the direction of the virtual viewpoint IV (step S110). Specifically, the AR processing unit 142 sets the virtual camera CML in the viewpoint direction VD at a position separated to the left (by the interocular distance 122/2) from the virtual viewpoint IV. Similarly, the AR processing unit 142 sets a virtual camera CMR at a position corresponding to the right eye on the basis of the position and the direction of the virtual viewpoint IV (step S120). Specifically, the AR processing unit 142 sets the virtual camera CMR in the viewpoint direction VD at a position separated to the right (by the interocular distance 122/2) from the virtual viewpoint IV. FIG. 8 illustrates the virtual cameras CML and CMR set as described above.

After setting the virtual cameras, the AR processing unit 142 performs two-dimensional (2D) projection of the virtual camera CML (step S112). Specifically, the AR processing unit 142 converts three-dimensional objects (virtual objects OB1 and OB2) in the 3D model space into information of two-dimensional plane acquired by the virtual camera CML and generates an image with a sense of depth. Similarly, the AR processing unit 142 performs two-dimensional (2D) projection of the virtual camera CMR (step S122). Specifically, the AR processing unit 142 converts the three-dimensional objects in the 3D model space into information of two-dimensional plane acquired by the virtual camera CMR and generates an image with a sense of depth.

After performing the 2D projection of the virtual camera CML, the AR processing unit 142 scales the image obtained by the projection (step S114). Specifically, the AR processing unit 142 performs the following procedures b1 to b3.

(b1) The AR processing unit 142 applies the target distance Lb determined in the procedure a1 to Expression (1) to calculate the target convergence angle theta b.

(b2) The AR processing unit 142 applies the calculated target convergence angle theta b and the initial convergence angle theta a to Expression (2) to calculate the target parallactic angle theta x.

(b3) The 2D projection image of the virtual camera CML acquired in step S112 is enlarged/reduced so that the 2D projection image of the virtual camera CML acquired in step S112 and the 2D projection image of the virtual camera CM disposed at the virtual viewpoint IV are deviated from each other by theta x/theta pix pixels. At this time, the AR processing unit 142 considers the resolution of the right LCD 241.

Similarly, after performing the 2D projection of the virtual camera CMR, the AR processing unit 142 scales the image obtained by the projection (step S124). Specifically, the AR processing unit 142 performs the above procedures b1 and b2 and the following procedure b3.

(b3) The 2D projection image of the virtual camera CMR acquired in step S122 is enlarged/reduced so that the 2D projection image of the virtual camera CMR acquired in step S122 and the 2D projection image of the virtual camera CM disposed at the virtual viewpoint IV are deviated from each other by theta x/theta pix pixels. At this time, the AR processing unit 142 considers the resolution of the left LCD 242.

FIG. 9 illustrates a state where the AR processing unit 142 scales the image acquired by the projection using the 2D projection image DT of the virtual camera CM disposed at the virtual point IV as described above. In the above-mentioned example, it is assumed that the virtual camera CMR is set at the position corresponding to the right eye and the virtual camera CML is set at the position corresponding to the left eye. However, the positions and the number of the virtual cameras to be set can be changed. Thereafter, the AR processing unit 142 transmits the right-eye image data Data1 and the left-eye image data Data2 generated as described above to the image processing unit 160 (steps S116 and S126). Thereafter, by performing the display process described with reference to FIG. 2, the user of the head-mounted display 100 can visually recognize the stereoscopic virtual object OB in the viewing field VR.

As described above, in the augmented reality processing according to the second example, since the augmented reality processing unit (AR processing unit 142) fits the virtual objects OB1 and OB2 to the external scene SC in consideration of various conditions (the sizes of the right LCD 241 and the left LCD 242 and the distance between the virtual images VI displayed in front of the user's right and left eyes) on the display environment of the virtual image VI at the time of generating the image data (the right-eye image data Data1 and the left-eye image data Data2), it is possible to implement a head-mounted display device (head-mounted display 100) which can provide augmented reality with a user's visual discomfort reduced.

In the augmented reality processing according to the second example, the augmented reality processing unit (AR processing unit 142) determines the target distance Lb at which the user is caused to visually recognize the virtual objects OB1 and OB2, calculates the target convergence angle theta b which is a convergence angle at the target distance Lb from the determined target distance Lb, and calculates the target parallactic angle theta x which is a parallactic angle at the target distance Lb using the calculated target convergence angle theta b and the first convergence angle theta a (initial convergence angle theta a). The augmented reality processing unit (AR processing unit 142) can generate the right-eye image data Data1 and the left-eye image data Data2 by scaling the 2D projection images by the two virtual cameras (virtual cameras CMR and CML) using the calculated target parallactic angle theta x and the difference (theta pix) stored in the pixel parallactic angle storage unit (pixel parallactic angle 124).

In the augmented reality processing according to the second example, the augmented reality processing unit (AR processing unit 142) first arranges the virtual viewpoint IV on the basis of the target distance Lb at which the user is caused to visually recognize a virtual object at the time of setting the virtual cameras (virtual cameras CMR and CML) in the 3D model space. Then, the augmented reality processing unit (AR processing unit 142) arranges one virtual camera (virtual camera CMR) at a position separated by the interocular distance/2 from the arranged virtual viewpoint IV and arranges the other virtual camera (virtual camera CML) at a position separated by the interocular distance/2 from the arranged virtual viewpoint. As a result, the virtual cameras (virtual cameras CMR and CML) can acquire 2D projection images in consideration of both the target distance Lb at which the user is caused to visually recognize the virtual objects OB1 and OB2 and the user's interocular distance (interocular distance 122).

A-4. Augmented Reality Processing (Third Example)

In the augmented reality processing according to a third example, the virtual objects to be fitted to the external scene SC in the augmented reality processing according to the second embodiment can be changed with movement of a user. Hereinafter, only a procedure different from the augmented reality processing according to the second embodiment will be described. The same elements in the drawings as in the second example will be referenced by the same reference signs and detailed description thereof will not be repeated.

FIG. 10 is a flowchart illustrating the augmented reality processing according to the third example. This example is different from the second example illustrated in FIG. 7, in that steps S202 and S204 are performed after step S104 and the process flow goes to step S202 after steps S116 and S126 end.

In step S202, the AR processing unit 142 determines whether the user's viewpoint moves. Specifically, the AR processing unit 142 determines that the user's viewpoint moves when at least one of the current position coordinate of the user and the movement of the user's head is changed. The current position coordinate of the user is acquired from the position information of the control unit 10 detected by the GPS module 134. The movement of the user's head is acquired from the movement information detected by the 9-axis sensor 66. When the user's viewpoint does not move (NO in step S202), the AR processing unit 142 causes the process flow proceed to steps S110 and S120.

When the user's viewpoint moves (YES in step S202), the AR processing unit 142 sets the virtual viewpoint at a predetermined position in the 3D model space on the basis of the current position coordinate of the user and the movement of the user's head detected in step S202. Details thereof are the same as in step S104 illustrated in FIG. 7.

As described above, in the augmented reality processing according to the third example, it is possible to generate the right-eye image data Data1 and the left-eye image data Data2 by generating and scaling the 2D projection image of the virtual camera CML and the 2D projection image of the virtual camera CMR with the movement of the user's viewpoint, that is, with a variation of at least one of the current position coordinate of the user and the movement of the user's head. As a result, in addition to the effects of the second example, it is possible to change the virtual object to be fitted to the external scene SC with the movement of the user's viewpoint.

In this way, in the head-mounted display device (head-mounted display 100) according to the first embodiment, the image display unit 20 causes the user to visually recognize the virtual object OB, to which the visual effect (that is, the visual effect for enabling a stereoscopic view of the virtual object) for reducing the user's visual discomfort is added, as a virtual image VI. Accordingly, it is possible to provide an optical transmissive head-mounted display device which can provide augmented reality with a user's visual discomfort reduced.

B. Second Embodiment

A second embodiment of the invention will describe a configuration in which a "visual effect for fitting a virtual object to an ambient environment of a user" is employed as the "visual effect for reducing a user's visual discomfort" instead of the "visual effect for enabling a stereoscopic view of a virtual object". Only the configuration and the operation different from those of the first embodiment will be described below. The same elements in the drawings as in the first embodiment will be referenced by the same reference signs as described in the first embodiment and detailed description thereof will not be repeated.

B-1. Configuration of Head-Mounted Display Device

FIG. 11 is a block diagram illustrating a functional configuration of a head-mounted display 100a according to the second embodiment. This embodiment is different from the first embodiment illustrated in FIG. 2, in that a control unit 10a is provided instead of the control unit 10. The storage unit 120 of the control unit 10a includes neither the interocular distance 122 nor the pixel parallactic angle 124 (FIG. 2). The control unit 10a includes an AR processing unit 142a instead of the AR processing unit 142. The AR processing unit 142a is different from the AR processing unit of the first embodiment in the process details of the "augmented reality processing" to be performed. Specifically, the AR processing unit 142a performs augmented reality processing to be described below instead of the augmented reality processing according to the first embodiment described in the first to third examples.

B-2. Augmented Reality Processing

FIG. 12 is a flowchart illustrating an augmented reality processing procedure according to the second embodiment. In step S302, the AR processing unit 142a acquires three-dimensional information in which an ambient environment of a user is expressed as three-dimensional virtual objects in a three-dimensional space. The three-dimensional information is a so-called "3D model" expressing the ambient environment of a user. The AR processing unit 142a can acquire the three-dimensional information using any method of the following methods c1 to c3.

(c1) The AR processing unit 142a acquires three-dimensional information from an external device such as a ground server connected to the head-mounted display 100a.

(c2) When the three-dimensional information is stored in advance in the storage unit 120, the AR processing unit 142a acquires the three-dimensional information from the storage unit 120.

(c3) The AR processing unit 142a generates three-dimensional information expressing the ambient environment of a user using an external scene image captured by the camera 61 or means for irradiating a user's eyes with infrared rays and acquires the generated three-dimensional information.

In the methods c1 and c2, the AR processing unit 142a can determine an acquisition range of three-dimensional information on the basis of the current position coordinate of the user detected by the GPS module 134. In the method c3, when the three-dimensional information is generated with the camera 61, the AR processing unit 142a causes the camera 61 to acquire plural external scene images while continuously changing the angle. Then, the AR processing unit 142a can generate the three-dimensional information on the basis of difference information between the n-th (where n is an integer) captured external scene image and the (n+1)-th captured external scene image. At this time, it is preferable that the camera 61 is plural cameras which are arranged so that the imaging regions thereof cross each other. It is preferable that at least one of the plural cameras is fixed to a position corresponding to the user's eyeline. In order to cause the camera 61 to acquire the external scene images while continuously changing the angle, the AR processing unit 142a may instruct the camera 61 to capture an external scene image when the movement of the user detected by the 9-axis sensor 66 is greater than a predetermined threshold value.

In step S304, the AR processing unit 142a specifies the position and the direction in the three-dimensional information which correspond to the current position and the eyeline of the user in a real space. In other words, in step S304, the AR processing unit 142a can be said to specify the current position and the eyeline of a virtual user in the three-dimensional information. Specifically, the AR processing unit 142a uses any one method of the following methods d1 to d3.

(d1) The AR processing unit 142a specifies the current position and the eyeline of the virtual user in the three-dimensional information by comparing the three-dimensional information acquired in step S302 with the external scene image in the user's eyeline acquired by the camera 61 at the time of step S304.

(d2) The AR processing unit 142a specifies the current position of the virtual user in the three-dimensional information by comparing information of latitude and longitude included in the three-dimensional information acquired in step S302 with the current position coordinate (latitude and longitude) of the user acquired by the GPS module 134 at the time of step S304. The AR processing unit 142a specifies the eyeline of the virtual user in the three-dimensional information using the movement of the user's head acquired by the 9-axis sensor 66.

(d3) When plural signal generators are arranged in advance in a real space, the AR processing unit 142a specifies the current position and the eyeline of the virtual user in the three-dimensional information using intensity of radio waves or ultrasonic waves received from the signal generators.

In step S306, the AR processing unit 142a generates a mask object. The "mask object" is three-dimensional information viewed from the position and the direction corresponding to the current position and the eyeline of the user in the real space, in other words, three-dimensional information viewed from the current position and the eyeline of the virtual user. The AR processing unit 142a generates the mask object using the three-dimensional information obtained in step S302 and the positions and the directions in the three-dimensional information specified in step S304.

FIGS. 13A and 13B are diagrams illustrating an example of the mask object. FIG. 13A illustrates an external scene SC viewed from the current position and the eyeline of the user in the real space. The external scene SC is a scene of an office street in which buildings are arranged in lines. FIG. 13B illustrates a mask object VM viewed from the position and the direction in the three-dimensional information corresponding to the current position and the eyeline of the user in the real space. In the mask object VM, the ambient environment (external scene SC) of the user illustrated in FIG. 13A includes three-dimensional objects such as "buildings", "roads", "trees", and "a telephone pole", which are virtually expressed in a three-dimensional space.

The mask object is used to add a visual effect to a virtual object and is not displayed as an image. In step S306 of FIG. 12, three-dimensional information may be acquired from an external device such as a ground server connected to the head-mounted display 100a on the basis of the position and the direction in the three-dimensional information specified in step S304 and the mask object may be complemented.

In step S306 of FIG. 12, the AR processing unit 142a generates image data indicating a virtual object which is displayed as a virtual image VI by the AR processing unit 142a in the augmented reality processing. Specifically, for example, the AR processing unit 142a acquires arbitrary image data corresponding to the user's request or the purpose of the processing from plural image data pieces stored in advance in the storage unit 120.

In step S310, the AR processing unit 142a arranges the virtual object generated in step S308 in the mask object generated in step S306. At the time of arrangement, the AR processing unit 142a may consider the target distance at which the virtual object is arranged in order to enable display of the virtual object OB having a sense of perspective. The target distance can be determined, for example, using any one method of the following methods.

An external scene image in the user's eyeline acquired by the camera 61 is analyzed.

The current position coordinate of the user acquired by the GPS module 134 and the movement of the user's head acquired by the 9-axis sensor 66 are analyzed.

FIG. 14 is a diagram illustrating an example of arrangement of a virtual object OB in a mask object VM. The virtual object OB exemplified in FIG. 14 is a "bicycle". The position at which the virtual object OB is arranged in the mask object VM is "one side of a sidewalk in front of a tree". Here, when seen from the position and the direction (the current position and the eyeline of a virtual user) in the three-dimensional information specified in step S304, a "telephone pole" which is a part of the mask object is arranged between the virtual object (bicycle) arranged in the mask object and the user.

In step S312 of FIG. 12, the AR processing unit 142a adds an effect based on the ambient environment to the mask object VM in which the virtual object OB is arranged. In this embodiment, the "effect based on the ambient environment" means at least one of the following effects e1 to e3. The effects e1 to e3 may be independently employed or combinations thereof may be employed.

(e1) The AR processing unit 142a trims a portion of the virtual object OB which is a shadow of a three-dimensional object included in the mask object VM. For example, in the example illustrated in FIG. 14, the AR processing unit 142a trims the portion of the bicycle (virtual object OB) which is in the shadow of the telephone pole (three-dimensional object included in the mask object VM), that is, the portion of the bicycle which is not visible as the shadow of the telephone pole when seen from the current position and the eyeline of a virtual user as illustrated in FIG. 14. According to the effect e1, the AR processing unit 142a can trim a part of the virtual object OB as if the virtual object OB were in the shadow of a three-dimensional object (telephone pole in the drawing) present in a real space. Accordingly, the image display unit 20 can cause the user to visually recognize such a virtual image that the virtual object OB is hidden by an object (telephone pole) present in a real space.

(e2) The AR processing unit 142a performs lighting based on the ambient environment. Specifically, the AR processing unit 142a collects luminance information of regions of the mask object VM by recognizing an external scene image captured by the camera 61. The luminance information includes, for example, a shadow region, specular reflection, and diffused reflection. The AR processing unit 142a determines a type of light source to be added to the mask object VM, a color temperature of the light source, intensity of the light source, and the like on the basis of the collected luminance information. Here, examples of the type of light source include a point light, a spot light, a directional light, an ambient light, a hemisphere light, and an image-based light (IBL). The AR processing unit 142a performs lighting of the virtual object OB by arranging the light source having the determined type, color temperature, and intensity in the mask object VM.

FIG. 15 is a diagram illustrating a state of the virtual object OB subjected to lighting. In the example illustrated in FIG. 15, since the virtual object OB is subjected to lighting using the directional light DL, the shadow OBS of the virtual object OB is formed. In this way, according to the effect e2, the AR processing unit 142a can correct the virtual object OB so that the virtual object OB has brightness and darkness based on a real space. Accordingly, the image display unit 20 can cause the user to visually recognize a virtual image in which the virtual object OB is mixed with an object present in a real space. The light source described in step S312 of FIG. 12 may be added alone or may be added by combination. The AR processing unit 142a may collect the luminance information of the regions in the mask object VM using a method (for example, computation based on the current time and orientation) other than the analysis of an external scene image.

(e3) The AR processing unit 142a performs adjustment of behavior of the virtual object OB based on at least one of a restitution coefficient and a friction coefficient of each three-dimensional object included in the mask object VM. Specifically, the AR processing unit 142a calculates at least one of the restitution coefficient and the friction coefficient of the surface of each three-dimensional object included in the mask object VM by recognizing the external scene image captured by the camera 61. At this time, the AR processing unit 142a may calculate an average restitution coefficient or an average friction coefficient of each three-dimensional object or the restitution coefficient or the friction coefficient for each region of a three-dimensional object. The AR processing unit 142a adjusts the behavior of the virtual object OB varying with the lapse of time on the basis of the calculated restitution coefficient, the calculated friction coefficient, or both thereof.

FIG. 16 is a diagram illustrating a state where behavior of a virtual object OB is adjusted on the basis of restitution coefficients and friction coefficients. In the example illustrated in FIG. 16, a restitution coefficient XX (where X is an arbitrary number) and a friction coefficient XX are calculated and stored for each region of a three-dimensional object included in a mask object VM. The AR processing unit 142a changes movement DI of a virtual object OB having a ball shape on the basis of the restitution coefficients XX and the friction coefficients XX of the three-dimensional objects along the movement DI. In the example illustrated in the drawing, the AR processing unit 142a adjusts the height with which the virtual object OB is bounded on the basis of the restitution coefficient and the friction coefficient of the central lane of the road including three lanes. In this way, according to the effect e3, the AR processing unit 142a can adjust the behavior of the virtual object OB on the basis of at least one of the restitution coefficient and the friction coefficient of an object present in a real space. Accordingly, the image display unit 20 can cause a user to visually recognize a virtual image in which the virtual object OB moves with an influence of the object present in the real space.

In step S314 of FIG. 12, the AR processing unit 142a performs setting of a virtual camera and 2D projection using the virtual camera. Specifically, the AR processing unit 142a sets a virtual camera in the position and the direction (that is, the current position and the eyeline of a virtual user in the mask object VM) in the mask object VM corresponding to the current position and the eyeline of a user in a real space. Then, the AR processing unit 142a converts the virtual object OB in the mask object VM into information in a two-dimensional plane acquired by the virtual camera. Accordingly, the AR processing unit 142a can acquire image data of the virtual object OB having a visual effect added thereto by converting the virtual object OB in the mask object VM into a two-dimensional image.

FIG. 17 is a diagram illustrating image data acquired by 2D projection of a virtual camera. In the example illustrated in FIG. 17, the image data DT includes a virtual object (bicycle) in which a part of a front wheel is trimmed as the addition result of the effect e1 and a shadow OBS is added thereto as the addition result of the effect e2. At the time of setting the virtual camera in step S314, it is preferable that the AR processing unit 142a sets a depth of field of the virtual camera or the like on the basis of the distance from the user's eyes to the user's point of regard. Then, it is possible to add a defocus effect to the virtual object OB in the image data of the virtual object OB acquired by the 2D projection of the virtual camera. The virtual camera set in step S314 may be one camera, two virtual cameras corresponding to the user's right and left eyes, and three or more virtual cameras.

FIG. 18 is a diagram illustrating an example of a virtual image VI which is visually recognized by a user in the augmented reality processing according to the second embodiment. In step S316 of FIG. 12, the AR processing unit 142a transmits the image data DT generated as described above to the image processing unit 160. Thereafter, by performing the display process described with reference to FIG. 2, the user of the head-mounted display 100a can visually recognize the virtual object OB having the visual effects (trimming and the shadow OBS) added thereto in the viewing field VR.

As described above, in the head-mounted display device (head-mounted display 100a) according to the second embodiment, the image display unit 20 causes the user to visually recognize the virtual object OB with a user's visual discomfort reduced, that is, the virtual object OB to which the visual effects (that is, visual effects for fitting the virtual object to the ambient environment) for reducing the user's visual discomfort are added, as a virtual image VI. Accordingly, it is possible to provide an optical transmissive head-mounted display device which can provide augmented reality with a user's visual discomfort reduced. The augmented reality processing unit (AR processing unit 142a) fits the virtual object OB to the ambient environment by adding the visual effect to the virtual object OB using the mask object VM generated from the three-dimensional information. Accordingly, in comparison with an existing case in which a virtual object is fitted to the ambient environment by adding a visual effect to the virtual object on the basis of an image captured with a camera, it is possible to further improve fitting accuracy.

In the head-mounted display device (head-mounted display 100a) according to the second embodiment, the augmented reality processing unit (AR processing unit 142a) can add at least one visual effect of the trimming based on the environment (effect e1), the lighting based on the environment (effect e2), and the adjustment of behavior based on the environment (effect e3) to the virtual object OB. The augmented reality processing unit (AR processing unit 142a) can automatically estimate the ambient environment of the user (specifically, luminance information of the effect e2 and the restitution coefficients and the friction coefficients of the effect e3) by recognizing the external scene image (an image in the user's viewing field) captured by the image acquiring unit (camera 61).

C. Third Embodiment

A third embodiment of the invention describes a configuration in which a virtual object of which the coordinate position in a real space is set is controlled on the basis of the coordinate position and the shape of a real object in the real space. Only elements having different configurations and operations from the first embodiment will be described below. In the drawing, the same elements in the drawings as in the first embodiment will be referenced by the same reference signs as described in the first embodiment and detailed description thereof will not be repeated.

FIG. 19 is a diagram illustrating an example of a virtual image and a real scene which can be visually recognized by a user. As illustrated in FIG. 19, a virtual image VI generated by a head-mounted display 100b is displayed in the viewing field VR of a user wearing the head-mounted display 100b according to this embodiment. Here, a virtual object OB indicating a labyrinth navigator (guide) is displayed as the virtual image VI. In the viewing field VR of the user, the user can view an external scene SC through the right optical image display unit 26 and the left optical image display unit 28. Here, walls A1, A2, and A3 of a labyrinth as a real object A appear in the external scene SC. That is, the user can simultaneously visually recognize the virtual image VI and the external scene SC in the viewing field VR. Reference numeral 27 represents a virtual image display region in which the virtual image VI is displayed (in which the virtual image VI can be displayed) in the viewing field VR.

C-1. Configuration of Head-Mounted Display Device

FIG. 20 is a block diagram illustrating a functional configuration of the head-mounted display 100b according to the third embodiment. This embodiment is different from the first embodiment illustrated in FIG. 2, in that a control unit 10b is provided instead of the control unit 10 and an image display unit 20b is provided instead of the image display unit 20.

The image display unit 20b is different from the image display unit of the first embodiment, in that it includes a distance sensor 67 and an eyeline sensor 69 instead of the interpupillary distance measuring unit 62. The distance sensor 67 detects a distance from a user (strictly, the head-mounted display 100b) to a real object A, for example, using an infrared ray method or an ultrasonic wave method. The eyeline sensor 69 detects a user's eyeline, for example, using an infrared ray method.

A storage unit 120b of the control unit 10b stores neither the interocular distance 122 nor the pixel parallactic angle 124 (FIG. 2), which is different from the first embodiment. The control unit 10b includes an AR processing unit 142b instead of the AR processing unit 142 and includes an image analyzing unit 144 and an object detecting unit 146, which is different from the first embodiment.

The image analyzing unit 144 acquires an image signal of an image captured by the camera 61 and analyzes the acquired image signal. The image analyzing unit 144 recognizes an object recognition marker MK (see FIG. 19) disposed in a real object A by the image analysis and recognizes the real object A on the basis of information acquired from the marker MK. That is, the position of the real object A and the shape of the real object A in the viewing field VR are recognized on the basis of information of the position and the direction of the marker MK in the captured image, reading information obtained by reading the marker MK, and information (the shape of the real object A or the position of the marker MK in the real object A) of the real object A stored in advance. In this embodiment, the marker MK is disposed in the real object A and the real object A is recognized by recognizing the marker, but a configuration in which a feature position (feature point) of the real object A is recognized without using the marker and the real object A is recognized may be employed. The information of the real object A may be acquired from an external server through the use of the wireless communication unit 132 whenever an image is recognized.

The object detecting unit 146 detects the coordinate position and the shape of the real object A in a real space on the basis of the recognition result of the real object A by the image analyzing unit 144 and the detection result by a sensor. Specifically, the coordinate position of the real object A relative to a user in the real space and the shape of the real object A are detected on the basis of the recognition result of the real object A by the image analyzing unit 144, information of the distance from the user to the real object A which is acquired from the distance sensor 67, and information of the direction of the user's head acquired from the 9-axis sensor 66.

The AR processing unit 142b according to the third embodiment is different from the AR processing unit according to the first embodiment, in process details of the augmented reality processing to be performed. The AR processing unit 142b generates display data to be displayed by the image display unit 20 and transmits the generated display data to the image display unit 20 via the image processing unit 160. The AR processing unit 142b sets the coordinate position in the real space for a virtual object OB, and generates display data for displaying (so-called fitting) the virtual object OB of which the coordinate position in the real space is set on the basis of a coordinate system of the real space.

Specifically, the AR processing unit 142b sets the coordinate position relative to the real object A in the real space for the virtual object OB on the basis of contents data. Then, the AR processing unit 142b specifies the display position, the display size, and the direction of the virtual object OB in the virtual image display region 27 which are visually recognized on the basis of the coordinate system of the real space (which is visually recognized in the coordinate system of the real space) on the basis of the relative coordinate position of the virtual object OB, the detected coordinate position of the real object A, information of the direction of a user's head, and information of the user's eyeline acquired from the eyeline sensor 69. For example, when the virtual object OB is present in the coordinate system of the real space, the display size is determined depending on the distance from the user to the virtual object OB. Accordingly, the display size is specified by the distance from the user to the virtual object OB which is calculated on the basis of the above-mentioned information. The AR processing unit 142b enlarges/reduces, rotates, and arranges the virtual object OB on the basis of the specified display position, display size, and direction to generate display data including the virtual object OB.

When the virtual object OB is displayed as a stereoscopic image, display data in which a parallax is added to the virtual object OB is generated as right-eye display data and left-eye display data, the right-eye display data is transmitted to the right LCD control unit 211 via the image processing unit 160, and the left-eye display data is transmitted to the left LCD control unit 212 via the image processing unit 160. In this case, an amount of parallax (sense of depth) of the virtual object OB is set on the basis of the coordinate system of the real space. That is, similarly to the display size, since the amount of parallax is determined depending on the distance from the user to the virtual object OB, the distance from the user to the virtual object OB is calculated from the above-mentioned information and the amount of parallax of the virtual object OB is set on the basis of the calculated distance.

The AR processing unit 142*b* controls behavior of the virtual object OB on the basis of the detected coordinate position and shape of the real object A. That is, it is described above that the relative coordinate position in the real space is set on the basis of the contents data, but strictly, the relative coordinate position is set on the basis of the contents data and the detected coordinate position and shape of the real object A. The virtual object OB is changed on the basis of the detected coordinate position and shape of the real object A. As a result, the virtual object OB is caused to behave in consideration of the detected coordinate position and shape of the real object A.

C-2. Augmented Reality Processing

FIG. 21 is a flowchart illustrating an augmented reality processing procedure according to the third embodiment. The augmented reality processing according to the third embodiment is performed with the manipulation of starting an operation in the control unit 10*b*.

As illustrated in FIG. 21, the head-mounted display 100*b* first captures an image of an external scene SC by the use of the camera 61 (S1). The image analyzing unit 144 recognizes a marker MK in the image captured by the camera 61 and recognizes the real object A (S2). In the example illustrated in FIG. 2, the walls A1 and A2 for recognizing the marker MK are recognized from the captured image.

When the real object A is recognized, the distance from the user to the real object A is detected by the distance sensor 67 (S3) and the direction of the user's head is detected by the 9-axis sensor 66 (S4). Then, the coordinate position (coordinate position relative to the user) and the shape of the real object A are detected by the object detecting unit 146 on the basis of the recognition result of the real object A by the image analyzing unit 144, information of the detected distance from the user to the real object A, and information of the detected direction of the head (S5).

When the coordinate position and the shape of the real object A are detected, the user's eyeline is detected by the eyeline sensor 69 (S6). The viewing fieldVR (the direction thereof) of the user is estimated by the AR processing unit 142*b* on the basis of information of the detected eyeline and information of the detected direction of the head (S7).

Thereafter, the AR processing unit 142*b* sets the coordinate position (coordinate position relative to the real object A) of the virtual object OB in the real space on the basis of the contents data and the detected coordinate position and shape of the real object A (S8). The AR processing unit determines the display position, the display size, and the direction of the virtual object OB so as to visually recognize the virtual object in the coordinate system of the real space on the basis of the estimated viewing field VR, the set coordinate position (coordinate position relative to the real object A) of the virtual object OB, and the detected coordinate position (coordinate position relative to the user) of the real object A (S9), and generates display data including the virtual object OB (S10). Thereafter, the AR processing unit transmits the generated display data to the image display unit 20 via the image processing unit 160 (S11). The "display control step" mentioned in the appended claims corresponds to steps S6 to S10.

The image display unit 20 displays the display data including the virtual object OB (projects image light to a retina) (S12, display step). Then, the display operation ends.

Behavior control of the virtual object OB by the AR processing unit 142*b* will be described below with reference to FIGS. 22 to 24. As described above, the AR processing unit 142*b* controls the behavior of the virtual object OB on the basis of the detected coordinate position and shape of the real object A. FIG. 22 is a transition diagram illustrating a first example of the behavior control of the virtual object OB by the AR processing unit 142*b*. In the example illustrated in FIG. 22, the AR processing unit 142*b* changes the virtual object OB so that the overlapping portion OBa of the virtual object OB with the real object A disappears when (it is estimated that) the virtual object OB is located in the back of the real object A from the viewpoint of the user on the basis of the detected coordinate position of the real object A and the set coordinate position of the virtual object OB. Specifically, as illustrated in the drawing, when the virtual object OB is caused to move to the back of the wall A1 from the viewpoint of the user, the virtual object OB is changed so that the overlapping portion OBa with the wall A1 disappears from the viewpoint of the user. In this way, the virtual object OB is displayed as if the virtual object is hidden by the wall A1 from the viewpoint of the user.

FIG. 23 is a transition diagram illustrating a second example of the behavior control of the virtual object OB by the AR processing unit 142*b*. In the example illustrated in FIG. 23, the AR processing unit 142*b* causes the virtual object OB to behave so as to avoid the real object A in the coordinate system of the real space. Specifically, as illustrated in the drawing, when the virtual object OB moves to the vicinity of a pillar A4 as an obstacle, the trajectory of the virtual object OB is changed and the virtual object is displayed as if it avoided the real object A.

FIG. 24 is a transition diagram illustrating a third example of the behavior control of the virtual object OB by the AR processing unit 142*b*. In the example illustrated in FIG. 24, when the virtual object OB moves and reaches the real object A in the coordinate system of the real space, the AR processing unit 142*b* causes the virtual object OB to behave as if it collided with the real object A. Specifically, as illustrated in the drawing, when the virtual object OB moves until it reaches the wall A2, the trajectory of the virtual object OB is changed to rebound from the wall A2 and the virtual object is displayed as if it collided with the real object A. At the time point at which the virtual object OB reaches the wall A1, the virtual object OB is changed (the size is reduced in the collision direction in the example illustrated in the drawing) as if the virtual object OB collides with the real object A.

In the augmented reality processing according to the third embodiment, since the virtual object OB can be caused to behave in consideration of the coordinate position or the shape of the real object A, it is possible to improve a sense of reality. Accordingly, it is possible to provide an optical transmissive head-mounted display device (head-mounted display 100*b*) which can provide augmented reality with a user's visual discomfort reduced. By causing the virtual object OB to behave in consideration of the coordinate position or the shape of the real object A, a transmissive head-mounted display device can provide contents coupled to a real object A. Therefore, it is possible to provide a game or navigation service in which a virtual object OB is coupled to a real object A. In an example of the contents of the navigation service, it is thought that a guide of a labyrinth is displayed as a virtual object OB and the guide shows a path while avoiding the walls A1, A2, and A3 in consideration of the walls A1, A2, and A3 of the labyrinth. In an example of the contents of the game, it is thought that a ball is displayed as a virtual object OB and the thrown ball reaches the walls A1, A2, and A3 and rebounds therefrom.

By detecting an eyeline by the use of the eyeline sensor 69 and displaying a virtual object OB in consideration of a user's eyeline, it is possible to fit the virtual object OB (to determine the display position, the display size, and the direction of the virtual object OB) with high accuracy.

By detecting a distance from a user to a real object A by the use of the distance sensor 67 and displaying a virtual object OB in consideration of the distance, it is possible to fit the virtual object OB with high accuracy.

This embodiment describes the configuration in which the coordinate position relative to the real object A is set as the coordinate position of the virtual object OB in the real space, but a configuration in which the coordinate position relative to a user is set as the coordinate position of the virtual object OB in the real space or a configuration in which the absolute position is set as the coordinate position of the virtual object OB in the real space may be employed.

This embodiment describes the configuration in which the coordinate position relative to a user is detected as the coordinate position of a real object A in the real space, but a configuration in which the absolute position is detected as the coordinate position of the real object A in the real space may be employed.

This embodiment describes the configuration in which a user's eyeline is detected and the user's viewing field is detected on the basis of the user's eyeline and the direction of the user's head, but a configuration in which the user's eyeline is determined to always face the front side and the user's viewing field is detected on the basis of only the direction of the user's head may be employed.

In this embodiment, the marker MK for recognizing an object may be an AR marker or a two-dimensional code (such as a QR code) or a barcode.

This embodiment describes the configuration in which an image of a real scene is captured by the camera 61 and the coordinate position and the shape of a real object A are detected by recognition of the captured image, but a configuration in which map data including the coordinate positions and the shapes of all real objects A within a predetermined range in the real space is stored in advance and the coordinate position and the shape of the real object A are detected on the basis of the map data may be employed.

This embodiment may employ a configuration in which the interocular distance, or the right and left parallactic angle, the convergence angle, the dominant eye, the parallax with an image, a user's relative speed to a real object, or the like is detected to enhance fitting accuracy of a virtual object OB and the virtual object OB is fitted in consideration of the detected data.

It is preferable that a light source environment of an external scene SC is estimated and the color and the brightness of a virtual object OB are adjusted depending on the light source environment. It is also preferable that the color and the brightness of a virtual object OB are determined in consideration of a distance from a user to a real object A and a variation in visual environment of a user (for example, dark adaptation or light adaptation).

This embodiment may employ a configuration in which a distance from a user to a virtual object OB in the coordinate system of the real space is calculated and the focal distance of the virtual object OB is changed.

This embodiment may also employ a configuration in which a user operation in contents is performed by a controller not illustrated in the drawings or a configuration in which a part of a user's body (such as a finger or a hand) and behavior of the part of the body is received as the user operation. For example, a user's hand, finger, arm, or the like is recognized and the AR processing unit 142b displays a virtual object OB such as a bat, a racket, a trump, or a pen as if they were carried with the user's hand. The user moves the hand, the finger, the arm, or the like to operate the virtual object OB and this operation may be received as a user operation. In this case, when the virtual object OB is located in the back of the user's hand, finger, arm, or the like as a real object A from the viewpoint of the user, the virtual object OB is changed so that the overlapping portion of the virtual object OB with the real object A is deleted. The real object A (such as the bat, the racket, the trump, or the pen) which can be handled by the user is recognized and behavior of the real object A may be received as the user operation. In addition, the movement (for example, the direction) of a user's head or a user's eyeline is detected and the detected data may be received as the user operation.

The virtual object OB to be displayed is not limited to the above-mentioned objects, but a virtual object OB such as an arrow or a mark may be displayed. A part of an object or a human body (a finger tip, an arm, or the like) in a real space may be imaged and received and the captured image may be displayed as a virtual object OB.

D. Modification Example

In the above-mentioned embodiments, a part of elements embodied by hardware may be replaced with software, or a part of elements embodied by software may be replaced with hardware. In addition, the following modifications can be considered.

Modification Example 1

The above-mentioned embodiments describe the configuration of the head-mounted display. However, the configuration of the head-mounted display can be arbitrarily determined without departing from the gist of the invention, and for example, the elements may be added, deleted, changed, and the like.

In the above-mentioned embodiments, allocation to the control unit and the image display unit is only an example and various aspects can be employed. For example, the following aspects may be considered: (i) an aspect in which the control unit is provided with processing functions of a CPU or a memory and the image display unit is provided with only a display function; (ii) an aspect in which both the control unit and the image display unit are provided with the processing functions of the CPU or the memory; (iii) an aspect in which the control unit and the image display unit are incorporated into a single unit (for example, an aspect in which the image display unit includes the control unit and the whole configuration serves as a glasses-like wearable computer); (iv) an aspect in which a smart phone or a portable game machine is used instead of the control unit; and (v) an aspect in which the control unit and the image display unit are configured to wirelessly communicate with each other or to be supplied with power in a wireless manner and the connecting section (cord) is made unnecessary.

The above-mentioned embodiments describe the configuration in which the control unit includes the transmitter unit and the image display unit includes the receiver unit, for the purpose of convenience of explanation. However, the transmitter unit and the receiver unit in the above-mentioned embodiments may have a bidirectional communication function and may serve as a transceiver unit. For example, the control unit illustrated in FIG. 2 is connected to the image display unit via a wired signal transmission line. However, the control unit and the image display unit may be connected to each other via a wireless signal transmission line such as a wireless LAN, infrared communication, or Bluetooth (registered trademark).

For example, the configurations of the control unit and the image display unit illustrated in FIG. 2 can be arbitrarily modified. Specifically, for example, the touch pad may be removed from the control unit and the operation may be carried out using only the cross key. The control unit may be provided with another operation interface such as an operational stick. The control unit may be configured to be connected to a device such as a keyboard or a mouse and may receive an input from the keyboard or the mouse. For example, an operation input using a foot switch (a switch operated with a user's foot) may be acquired in addition to the operation inputs using the touch pad and the cross key. For example, the image display unit may be provided with an eyeline detecting unit such as an infrared sensor, a user's eyeline may be detected, and an operation input based on a command correlated with the movement of the eyeline may be acquired. For example, a user's gesture may be detected using a camera and an operation input based on a command correlated with the detected gesture may be acquired. At the time of detecting the gesture, a user's finger tip, a ring worn by a user's finger, a medical instrument grasped by a user's hand, or the like may be moved and may be used as a mark for detection. When the operation input using the foot switch or the eyeline can be acquired, the input information acquiring unit can acquire an operation input from a user even in work in which it is difficult to unhand.

For example, the head-mounted display is described above as a binocular type transmissive head-mounted display, but a monocular type head-mounted display may be employed. A non-transmissive head-mounted display that blocks an external scene in a state where a user wears the head-mounted display may be employed.

FIGS. 25A and 25B are diagrams illustrating an outer configuration of a head-mounted display according to a modification example. In the example illustrated in FIG. 25A, the head-mounted display is different from the head-mounted display 100 illustrated in FIG. 1, in that an image display unit 20a includes a right optical image display unit 26a instead of the right optical image display unit 26 and includes a left optical image display unit 28a instead of the left optical image display unit 28. The right optical image display unit 26a is formed with a size smaller than the optical member according to the first embodiment and is disposed on the oblique upper side of a user's right eye in a state where the user wears the head-mounted display. Similarly, the left optical image display unit 28a is formed with a size smaller than the optical member according to the first embodiment and is disposed on the oblique upper side of a user's left eye in a state where the user wears the head-mounted display. In the example illustrated in FIG. 25B, the head-mounted display is different from the head-mounted display 100 illustrated in FIG. 1, in that an image display unit 20b includes a right optical image display unit 26b instead of the right optical image display unit 26 and includes a left optical image display unit 28b instead of the left optical image display unit 28. The right optical image display unit 26b is formed with a size smaller than the optical member according to the first embodiment and is disposed on the oblique lower side of a user's right eye in a state where the user wears the head-mounted display. Similarly, the left optical image display unit 28b is formed with a size smaller than the optical member according to the first embodiment and is disposed on the oblique lower side of a user's left eye in a state where the user wears the head-mounted display. In this way, the optical image display unit has only to be disposed in the vicinity of the user's eyes. The size of the optical member constituting the optical image display unit is not limited, and a head-mounted display of an aspect in which the optical image display unit covers a part of the user's eye, that is, an aspect in which the optical image display unit does not fully cover the user's eye, may be embodied.

For example, it is described above that the functional units such as the image processing unit, the display control unit, the AR processing unit, and the sound processing unit are embodied by causing the CPU to develop a computer program stored in a ROM or a hard disk into a RAM and to execute the developed computer program. However, the functional units may be embodied by an application specific integrated circuit (ASIC) designed to perform the functions.

For example, the above-mentioned embodiments describe that the image display unit is a head-mounted display which is mounted like a pair of glasses, but the image display unit may be a general panel display device (such as a liquid crystal display device, a plasma display device, and an organic EL display device). In this case, the control unit and the image display unit may be connected to each other via a wired signal transmission line or via a wireless signal transmission line. By employing this configuration, the control unit may be used as a remote controller of a general panel display device.

An image display unit having a different shape such as an image display unit which is mounted like a hat may be employed as the image display unit instead of the image display unit which is mounted like a pair of glasses. The earphone may be of an ear hook type or of a head band type or may be skipped. For example, the image display unit may be embodied as a head-up display (HUD) mounted on a vehicle such as an automobile or an airplane. For example, the image display unit may be embodied as a head-mounted display built into a body protecting instrument such as a helmet.

For example, the above-mentioned embodiments describe that a secondary battery is used as the power supply, but the power supply is not limited to the secondary battery and various batteries may be used. For example, a primary battery, a fuel cell battery, a solar cell battery, and a thermal battery may be used.

For example, the above-mentioned embodiments describe that the image light generating unit includes the backlight, the backlight control unit, the LCD, and the LCD control unit. However, this configuration is only an example. The image light generating unit may include a constituent unit for embodying another scheme in addition to the constituent units or instead of the constituent units. For example, the image light generating unit may include an organic electroluminescence (EL) display and an organic EL control unit. For example, the image light generating unit may include a digital micromirror device instead of the LCD. For example, the invention can be applied to a laser retina projection type head-mounted display device.

Modification Example 2

The first embodiment describes an example of the augmented reality processing procedure. However, the augmented reality processing procedure is only an example and can be modified in various forms. For example, some steps may be skipped or another step may be added thereto. The order of the steps to be performed may be changed.

The above-mentioned embodiments describe that the pixel parallactic angle is defined as a difference between the convergence angle of a virtual image displayed on the basis of image data which are laterally identical to each other and the convergence angle of a virtual image displayed on the basis of image data which are laterally deviated by one pixel from each other. However, the pixel parallactic angle has only to be a difference between the convergence angle of a virtual image displayed on the basis of image data which are laterally identical to each other and the convergence angle of a virtual image displayed on the basis of image data which are laterally deviated from each other, and the amount of deviation of the right and left image data is not limited to one pixel.

For example, in the augmented reality processing procedure, when the calculated target parallactic angle theta x is greater than the parallelism (that is, theta x<−theta a/2), the AR processing unit can suppress generation of image data for embodying the target parallactic angle theta x. Accordingly, it is possible to reduce a user's discomfort.

When the parallactic angle is excessively great, a user can easily feel discomfort. Accordingly, for example, when the calculated target parallactic angle theta x is equal to or greater than a predetermined threshold value in the augmented reality processing procedure (that is, theta x>theta lim), the AR processing unit can suppress generation of image data for embodying the target parallactic angle theta x. The predetermined threshold value (theta lim) is preferably set to a "boundary between the parallax at which an object appears dual and the parallax at which an object appears singly for the user". The predetermined threshold value (theta lim) may be adjusted depending on a user's taste.

The AR processing unit may adjust chroma, brightness, and contrast of the right-eye image data and the left-eye image data depending on the determined magnitude of the target distance Lb or the calculated magnitude of the target parallactic angle theta x. For example, by lowering at least one of chroma, brightness, and contrast of image data indicating a virtual object to be displayed distantly, it is possible to emphasize a user's feeling of perspective.

The parallactic angle theta pix stored in the pixel parallactic angle may be adjusted depending on a user's taste. A user can adjust the parallactic angle theta pix to be smaller when the user wants to emphasize the sense of perspective, and can adjust the parallactic angle theta pix to be greater when the user wants to alleviate the sense of perspective.

Modification Example 3

In the first embodiment, the AR processing unit may perform the augmented reality processing procedure by matching an external scene image in a user's viewing field acquired by the camera with patterns using the pixel parallactic angle. Specifically, the image display unit includes a right-eye camera and a left-eye camera. The right-eye camera is a camera which is disposed at a position of the image display unit corresponding to a user's right eye and which can capture an image of an external scene on the front side of the image display unit. The left-eye camera is a camera which is disposed at a position of the image display unit corresponding to a user's left eye and which can capture an image of an external scene on the front side of the image display unit. The AR processing unit may calculate an amount of deviation between a target object (an object in which a virtual object is displayed in the vicinity thereof) included in the image captured by the right-eye camera and a target object included in the image captured by the left-eye camera and may determine the "target distance" in the augmented reality processing procedure using the amount of deviation and the pixel parallactic angle.

Modification Example 4

In the first embodiment, the AR processing unit may perform the augmented reality processing procedure only when a predetermined condition is satisfied. For example, the image display unit may be provided with a configuration for detecting a user's eyeline and the AR processing unit may perform the augmented reality processing procedure only when the detected eyeline satisfies any one of the following conditions.

A range of viewing angle of about 200 degree horizontally and about 125 degree vertically (for example, 75 degree downward and 50 degree upward)

A range of viewing angle of about 30 degree horizontally and about 20 degree vertically as an effective viewing field in which information acceptance capability is excellent A range of viewing angle of about 60 degree to 90 degree horizontally and about 45 degree to 70 degree vertically as a stable field of fixation in which a point of regard is rapidly and stably viewed A range of viewing angle of from about 20 degree horizontally at which self-motion perception (vection) induced in an image starts to about 110 degree at which the self-motion perception is saturated Modification Example 5

The second embodiment describes an example of the augmented reality processing procedure. However, the augmented reality processing procedure is only an example and can be modified in various forms. For example, some steps may be skipped or another step may be added thereto. The order of the steps to be performed may be changed.

The augmented reality processing procedure according to the second embodiment is described above as an alternative procedure of the augmented reality processing procedure according to the first embodiment. However, the augmented reality processing procedure according to the second embodiment may be performed in parallel with the augmented reality processing procedure according to the first embodiment.

In step S302 of the augmented reality processing procedure according to the second embodiment, the methods c1 to c3 of acquiring three-dimensional information are exemplified. However, the methods are only examples, and the AR processing unit may acquire the three-dimensional information using methods other than the methods c1 to c3. The AR processing unit may correct the three-dimensional information acquired using one method (for example, the method c3) on the basis of information acquired using another method (for example, the method c1).

In the augmented reality processing procedure according to the second embodiment, in order to adjust balance of the size of the real space with the size of the virtual object, a process of artificially matching (calibrating) the size of a region which can be imaged with the camera and the size of a region which is projected as a virtual image onto a user's eyes may be performed.

The effects e1 to e3 in step S312 of the augmented reality processing procedure according to the second embodiment are only examples and the effects to be added by the AR processing unit can be arbitrarily determined. For example, the AR processing unit may add the following effect instead of the effects e1 to e3 or in addition to the effects e1 to e3. Specifically, the AR processing unit adds an effect for providing a sense of perspective to a virtual object depending on the target distance at which the virtual object is arranged. As the effect for providing a sense of perspective, a fog effect can be employed when the target distance is great, and a sharpness effect can be employed when the target distance is small.

Modification Example 6

The invention is not limited to the above-mentioned embodiments, examples, and modification examples, but can be modified in various forms without departing from the gist of the invention. For example, the technical features of the embodiments, the examples, and the modification examples corresponding to the technical features of the aspects described in the summary of invention can be appropriately exchanged or combined in order to solve all or a part of the above-mentioned problems or to achieve all or a part of the above-mentioned effects. The technical features can be appropriately deleted when the technical features are not described to be essential in the specification.

What is claimed is:

1. A head-mounted display device that enables a user to visually recognize a virtual image and an external scene, comprising:
    an image display unit that displays the virtual image, the image display unit including a right optical image display unit and a left optical image display unit; and
    an augmented reality processing unit configured to:
        determine a target distance at which the user is caused to visually recognize the virtual image in the external scene;
        set two virtual cameras for acquiring a 2D projection image in a 3D model space based on the target distance;
        obtain a first convergence angle of the virtual image displayed on the basis of first right-eye image data and first left-eye image data which are identical to each other;
        calculate a target convergence angle, which is a convergence angle at the target distance with respect to two eyes of the user;
        calculate a target parallactic angle, which is a parallactic angle at the target distance, according to the target convergence angle and the first convergence angle;
        generate right-eye image data and left-eye image data based on the 2D projection image according to the target parallactic angle respectively;
        cause the right optical image display unit to display the virtual image based on the right-eye image data; and
        cause the left optical image display unit to display the virtual image based on the left-eye image data.

2. The head-mounted display device according to claim 1, wherein:
    the head-mounted display device further comprises a pixel parallactic angle storage unit that stores a difference between the first convergence angle of the virtual image displayed on the basis of the first right-eye image data and the first left-eye image data which are identical to each other and a second convergence angle of the virtual image displayed on the basis of second right-eye image data and second left-eye image data which are laterally deviated from each other; and
    the augmented reality processing unit generates the right-eye image data and the left-eye image data for fitting the virtual object to the external scene using the difference stored in the pixel parallactic angle storage unit.

3. The head-mounted display device according to claim 2, wherein the augmented reality processing unit
    generates the right-eye image data and the left-eye image data from single image data indicating the virtual image using the target parallactic angle and the difference stored in the pixel parallactic angle storage unit.

4. The head-mounted display device according to claim 2, wherein the augmented reality processing unit
    generates the right-eye image data by scaling the 2D projection image captured by one virtual camera and generates the left-eye image data by scaling the 2D projection image captured by the other virtual camera using the target parallactic angle and the difference stored in the pixel parallactic angle storage unit.

5. The head-mounted display device according to claim 4, further comprising an interocular distance storage unit that stores the user's interocular distance,
    wherein the augmented reality processing unit further arranges a virtual viewpoint which is a virtual point of view in the 3D model space on the basis of the determined target distance at the time of setting the two virtual cameras, arranges one virtual camera at a position separated by the interocular distance/2 from the arranged virtual viewpoint, and arranges the other virtual camera at a position separated by the interocular distance/2 from the arranged virtual viewpoint.

6. The head-mounted display device according to claim 5, further comprising an interpupillary distance measuring unit that measures the user's interpupillary distance,
    wherein the measurement result by the interpupillary distance measuring unit is stored as the interocular distance in the interocular distance storage unit.

7. A control method of a head-mounted display device that enables a user to visually recognize a virtual image and an external scene, the head-mounted display including an image display unit that displays the virtual image, the image display unit includes a right optical image display unit and a left optical image display unit, and an augmented reality processing unit, the control method comprising:
    determining a target distance at which the user is caused to visually recognize the virtual image in the external scene;
    setting two virtual cameras for acquiring a 2D projection image in a 3D model space based on the target distance;
    obtaining a first convergence angle of the virtual image displayed on the basis of first right-eye image data and first left-eye image data which are identical to each other;
    calculating a target convergence angle, which is a convergence angle at the target distance with respect to two eyes of the user;
    calculating a target parallactic angle, which is a parallactic angle at the target distance, according to the target convergence angle and the first convergence angle;
    generating right-eye image data and left-eye image data based on the 2D projection image according to the target parallactic angle respectively;
    causing the right optical image display unit to display the virtual image based on the right-eye image data; and
    causing the left optical image display unit to display the virtual image based on the left-eye image data.

* * * * *